(12) United States Patent
Kishigami et al.

(10) Patent No.: US 8,391,245 B2
(45) Date of Patent: Mar. 5, 2013

(54) TERMINAL DEVICE, BASE STATION DEVICE, AND FREQUENCY RESOURCE ALLOCATION METHOD

(75) Inventors: Takaaki Kishigami, Tokyo (JP); Atsushi Sumasu, Kanagawa (JP); Isamu Yoshii, Kanagawa (JP); Tomohiro Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 12/672,253

(22) PCT Filed: Aug. 8, 2008

(86) PCT No.: PCT/JP2008/002178
§ 371 (c)(1),
(2), (4) Date: Feb. 4, 2010

(87) PCT Pub. No.: WO2009/019892
PCT Pub. Date: Feb. 12, 2009

(65) Prior Publication Data
US 2011/0222525 A1    Sep. 15, 2011

(30) Foreign Application Priority Data
Aug. 9, 2007  (JP) ................. 2007-208611

(51) Int. Cl.
*H04W 4/00* (2009.01)
(52) U.S. Cl. ........ 370/332; 370/344; 370/437; 370/480; 455/63.1; 375/132
(58) Field of Classification Search .......... 370/310, 370/310.2, 319, 323, 325, 328, 330, 331–333, 370/344, 437, 463, 480; 709/223, 224, 250; 455/63.1, 114.2, 278.1, 296; 375/132, 148
See application file for complete search history.

(56) References Cited

U.S. PATENT DOCUMENTS

| | | | |
|---|---|---|---|
| 5,428,818 A * | 6/1995 | Meidan et al. | 455/63.1 |
| 5,745,480 A * | 4/1998 | Behtash et al. | 370/333 |
| 6,671,309 B1 * | 12/2003 | Craig et al. | 375/132 |
| 7,783,293 B2 * | 8/2010 | Tujkovic et al. | 370/332 |
| 7,885,202 B2 * | 2/2011 | Li et al. | 370/252 |
| 8,086,242 B2 * | 12/2011 | Kent et al. | 455/452.2 |
| 2004/0228283 A1 * | 11/2004 | Naguib et al. | 370/333 |
| 2005/0163070 A1 * | 7/2005 | Farnham et al. | 370/328 |
| 2007/0280170 A1 * | 12/2007 | Kawasaki | 370/331 |

(Continued)

FOREIGN PATENT DOCUMENTS

| | | |
|---|---|---|
| WO | 2005/088873 A1 | 9/2005 |
| WO | 2006/011953 A2 | 2/2006 |

OTHER PUBLICATIONS

International Search Report dated Nov. 18, 2008.

(Continued)

*Primary Examiner* — Jeffrey M Rutkowski
(74) *Attorney, Agent, or Firm* — Dickinson Wright PLLC

(57) ABSTRACT

It is possible to realize reduction of inter-cell interference by an adaptive FFR with a low delay. A terminal (200) includes: an interference condition detection unit (209) which detects an interference condition of other cell to the local cell; a cell identification unit (210) which acquires signals for cell identification of each base station; and a sub-band selection unit (211) which selects a sub-band used for the downstream line transmission to the local station according to the interference condition detected by the interference condition detection unit (209) and the signals for cell identification of each base station obtained by the cell identification unit (210). Thus, the terminal (200) can autonomously select a small sub-band of inter-cell interference and to realize reduction of the inter-cell interference by the adaptive FFR with a low delay.

22 Claims, 27 Drawing Sheets

U.S. PATENT DOCUMENTS

2008/0043677 A1* 2/2008 Kim et al. .................... 370/332
2008/0227398 A1* 9/2008 Haghighat et al. ........... 455/63.1

OTHER PUBLICATIONS

T. Hattori, et al., "Fractional Frequency Reuse," Wireless Broadband Textbook vol. 2 (high speed IP wireless version), 2006, p. 266-268, with partial English translation.

3GPP TSG-RAN WG1#48-BIS, R1-071449, "Further Discussion on Adaptive Fractional Frequency Reuse," Nortel, Mar. 2007, p. 1-7.
3GPP TSG RAN WG1 Meeting #49. R1-072130, "ZC Sequence Based P-SCH Design Using No-Repetitive Structure," Motorola, May 2007, p. 1-8.

* cited by examiner

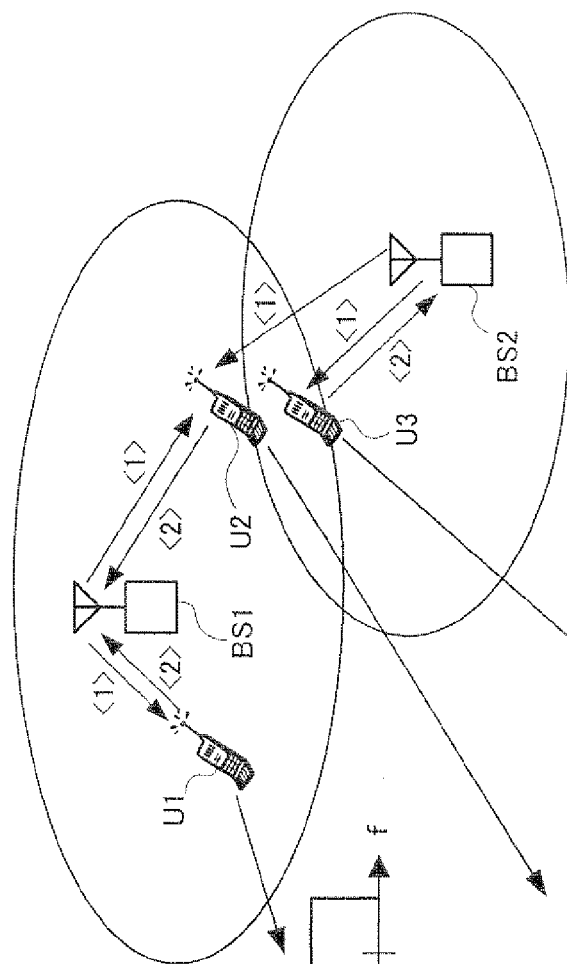
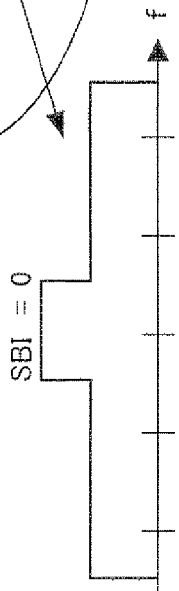
FIG.6A
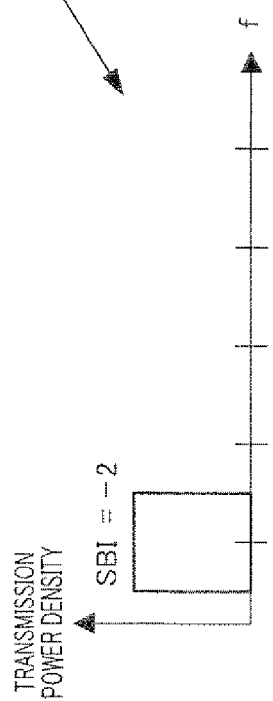
FIG.6B
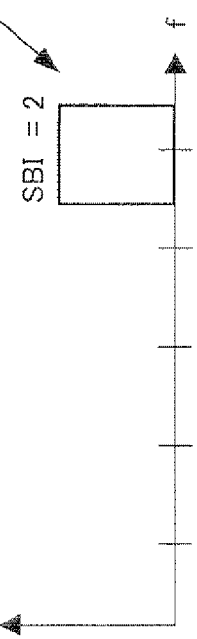
FIG.6C
FIG.6D

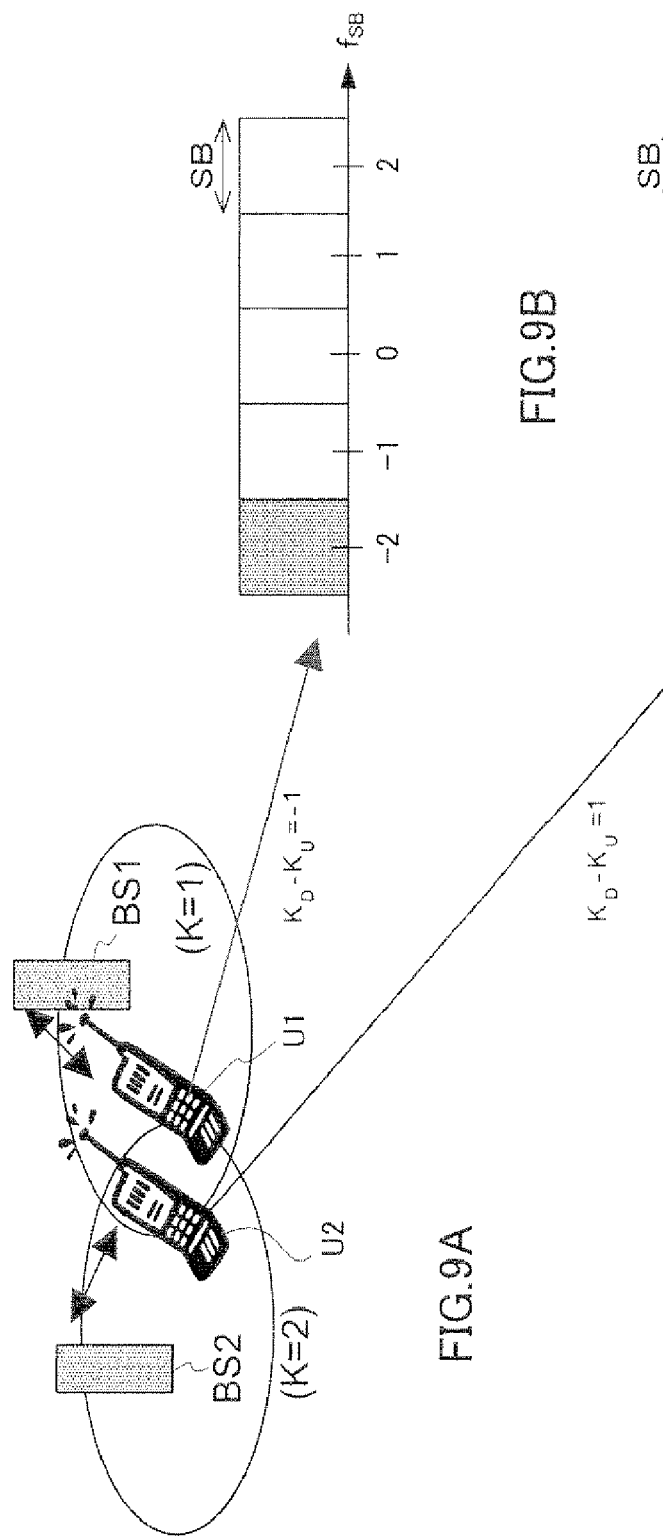

TERMINAL DEVICE, BASE STATION DEVICE, AND FREQUENCY RESOURCE ALLOCATION METHOD

TECHNICAL FIELD

The present invention relates to a terminal apparatus, a base station apparatus and a frequency resource allocation method for reducing inter-cell interference in a cellular mobile communication system.

BACKGROUND ART

A cellular mobile communication system has a parameter referred to as "frequency reuse factor ("RF")." In case where this reuse factor ("RF") is 1, the same frequency is used in all sectors. In such a case, a user (i.e. terminal apparatus) at a cell edge in the boarder between neighboring cells receives interference from a neighboring cell. As a result, SINR (Signal-to-Interference and Noise Ratio) deteriorates, thereby decreasing the throughput.

By contrast with this, in case where, for example, the reuse factor ("RF")=1/3, three frequencies are used to perform frequency allocation between cells or between sectors such that the same frequency is not used between neighboring cells or between sectors. In this case, although SINR improves, frequency use efficiency decreases by contrast because the operating band is divided into a plurality of partial bands and is used in each cell or in each sector, and therefore the frequency band used in each cell or in each sector narrows.

That is, when the reuse factor ("RF") becomes closer to 1, the same frequency is repeatedly used between cells or between sectors, and therefore, while the frequency use efficiency improves, interference increases depending on a situation.

Hence, to secure service areas for users at cell edges and secure system throughput, the method referred to as "fractional frequency reuse" ("FFR") has been introduced. Further, FFR includes static FFR for performing fixed frequency allocation and adaptive FFR for performing dynamic frequency allocation. For example, Non-Patent Document 1 discloses an overview of FFR.

As in the above-described case of RF=1/3, static FFR is directed to performing frequency allocation between cells or between sectors in a fixed manner. Further, Non-Patent Document 2 relates to adaptive FFR. An overview of adaptive FFR will be explained using FIG. 1. As shown in FIG. 1, according to adaptive FFR, the communication operating band is divided into a high power transmission band and a low power transmission band, and transmission power in the low power transmission band is varied stepwise to finely control gain with respect to coverage. In case where interference is reported, mode 1 transitions to mode 2 to provide a low power transmission band. In case where interference is reported even in mode 2, mode transitions to mode 3 and mode 4 to decrease transmission power in a low power transmission band. By this means, it is possible to not only provide an advantage of reducing interference upon users at cell edges and secure coverage while suppressing the decrease in throughput because the reuse factor is made 1 in the entire band except at cell edges.

Non-Patent Document 1: "Wireless broadband textbook (high speed IP wireless version)," page 266 to 268

Non-Patent Document 2: "3 GPP TSG-RAN WG1 R1-071449 (Nortel)," 3GPP LTE written contribution Non-Patent Document 3: "3GPP TSG-RAN WG1 R1-072130 (Motorola)," 3GPP LTE written contribution.

DISCLOSURE OF INVENTION

Problems to be Solved by the Invention

As described above, in ease where static FFR is performed, the frequency use efficiency decreases compared to the case where adaptive FFR is performed. By contrast with this, in case where adaptive FFR is performed, control is performed stepwise based on a report of interference, and therefore significant processing delay is produced until adaptive FFR is finished. Further, an inter-base-station communication interface is required to mediate base stations, and use of this also causes delay. Furthermore, during the period in which adaptive FFR is not finished after the initial cell search, downlink transmission (of control channel and data signal) needs to be performed in a state where there is inter-cell interference.

It is therefore an object of the present invention to provide a terminal apparatus, base station apparatus and frequency resource allocation method for reducing inter-cell interference by means of adaptive FFR while causing little delay.

Means for Solving the Problem

One aspect of the terminal apparatus according to the present invention employs a configuration which includes: an interference state detecting section that detects a state of interference from other cells to a cell to which the terminal apparatus belongs, based on signals transmitted from a plurality of base stations; and a subband selecting section that selects one of a subband used in downlink transmission for the terminal apparatus and a subband used in uplink transmission for a base station of the cell to which the terminal apparatus belongs, based on the interference state detected in the interference state detecting section.

One aspect of the terminal apparatus according to the present invention employs a configuration which includes: a cell identifying section that acquires signals for cell identification of the plurality of base stations, and in which the subband selecting section selects the subband based on the interference state detected in the interference state detecting section and the signals for cell identification of the base stations acquired in the cell identifying section.

One aspect of the base station apparatus according to the present invention employs a configuration which includes: a subband selection information acquiring section that acquires information about a subband selected by a terminal; and a transmitting/receiving section that performs transmission to and reception from the terminal using the subband selected by the terminal.

One aspect of the frequency resource allocation method according to the present invention includes: an interference state detecting step of, at a terminal apparatus, detecting a state of interference from other cells to a cell to which the terminal apparatus belongs, based on signals transmitted from a plurality of base stations; a subband selecting step of, at the terminal, selecting a subband based on the detected interference state; and a step of, at the terminal, performing communication using the selected subband.

One aspect of the frequency resource allocation method according to the present invention includes: a cell identifying step of acquiring signals for cell identification of the plurality of base stations, and in which the subband selecting step selects the subband based on the interference state and the signals for cell identification.

Advantageous Effects of Invention

According to the present invention, the terminal apparatus side autonomously selects a subband according to the interference state, so that it is possible to realize adaptive frequency reuse selection with little overhead (i.e. little delay) according to the interference state of the terminal apparatus.

BRIEF DESCRIPTION OF DRAWINGS

FIG. 6 shows how subbands are selected in terminals;

FIG. 6A shows how a subband is selected in a terminal near the center of a cell;

FIG. 6B and FIG. 6C show how subbands are selected in terminals near cell edges;

FIG. 6D shows the relationship between the positions of base stations and the positions of terminals;

FIG. 8 illustrates selection of subbands;

FIG. 9 illustrates selection of subbands;

FIG. 9A shows the relationship between terminals and cell identifiers;

FIG. 9B and FIG. 9C show how the signs of subband indices are selected based on the difference between cell identifiers;

FIG. 12 shows an example where subbands indicated by subband indices ("SBIs") partially overlap;

FIG. 13 shows an example where subbands indicated by subband indices ("SBIs") partially overlap;

FIG. 14 shows a case as an example where the subband width varies between subbands indicated by subband indices ("SBIs");

FIG. 15 shows a ease as an example where a subband having a configuration that combines an adaptive FFR field and a static FFR field is assigned;

BEST MODE FOR CARRYING OUT THE INVENTION

Hereinafter, embodiments of the present invention will be explained in detail with reference to the accompanying drawings.

Embodiment 1

(1) Configuration

First, the configurations of a base station apparatus (hereinafter simply "base station") and a terminal apparatus (hereinafter simply "terminal") according to the present embodiment will be explained. Note that a case will be explained with the present embodiment as an example where an OFDMA scheme is used as an access method.

Figure 1:
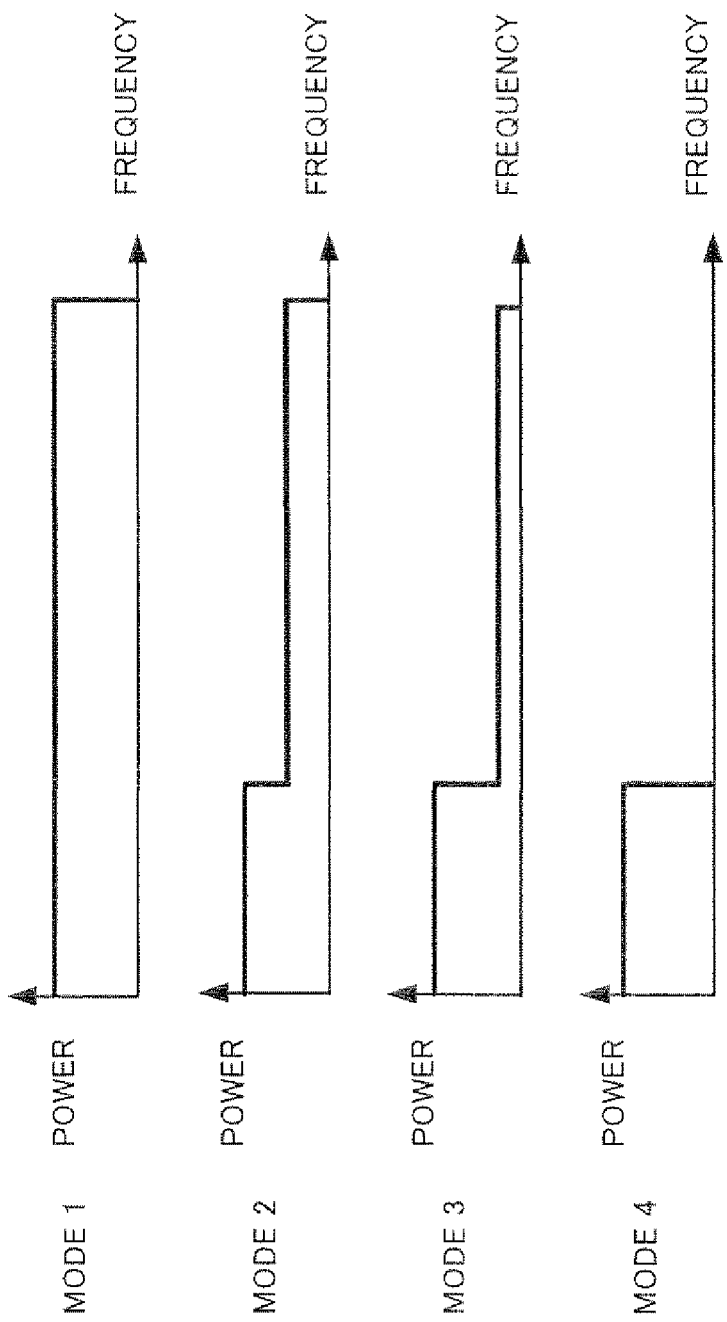
FIG. 1 illustrates adaptive FFR.
Figure 2:
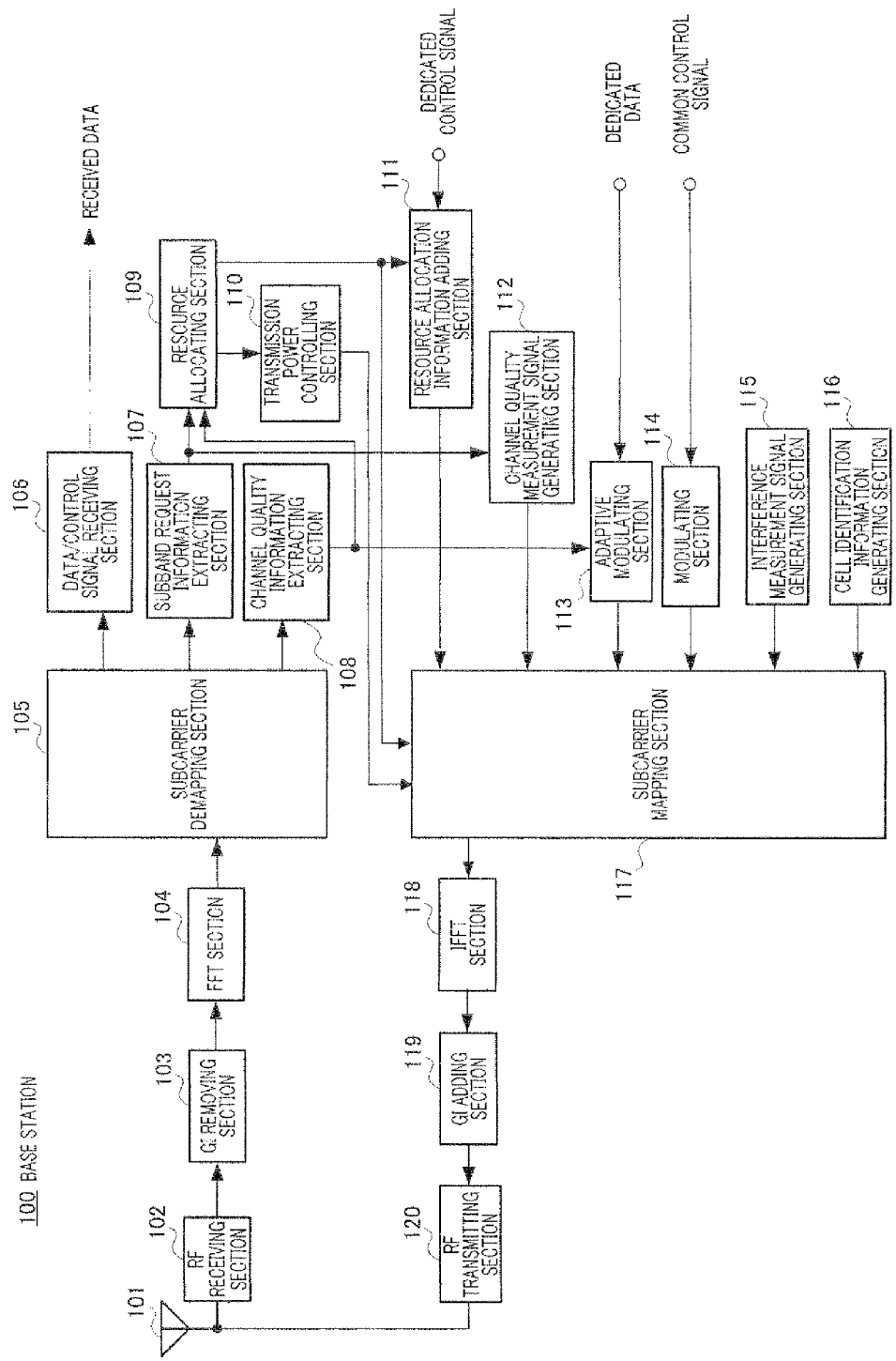
FIG. 2 is a block diagram showing the configuration of a base station apparatus according to Embodiment 1 of the present invention.

FIG. 2 shows the configuration of the base station. Base station 100 inputs a signal received at antenna 101, to RF (Radio Frequency) receiving section 102. RF receiving section 102 performs predetermined radio processing such as amplification processing and down-conversion processing of the received signal. GI (Guard Interval) removing section 103 removes a guard interval from the received signal subjected to radio processing, and FFT section 104 transforms the time domain signal into a frequency domain signal. By this means, a signal of each subcarrier is reproduced.

Subcarrier demapping section 105 sorts a signal mapped on each subcarrier, to each subsequent circuit. To be more specific, subcarrier demapping section 105 outputs the signal of a subcarrier on which a data signal and control signal are mapped, to data/control signal receiving section 106, the signal of a subcarrier on which subband request information is mapped, to subband request information extracting section 107, and the signal of a subcarrier on which channel quality information is mapped, to channel quality information extracting section 108.

Data/control signal receiving section 106 acquires received data by performing demodulation processing and error correction processing of the data signal and control signal. Control data in this received data is used to control base station 100.

Subband request information extracting section 107 extracts subband request information transmitted from a terminal, and outputs this subband request information to resource allocating section 109 and channel quality measurement signal generating section 112. Here, subband request information includes the index of a subband selected by each terminal (hereinafter "subband index" or simply "SBI").

Resource allocating section 109 determines frequency resources and time resources allocated to each terminal, based on the subband request information transmitted from each terminal. Here, to allocate the frequency resources, resource allocating section 109 assigns all subbands or part of subbands to each terminal based on subband index information from each terminal.

Further, resource allocating section 109 receives as input the channel quality information extracted in channel quality information extracting section 108. This channel quality information indicates downlink channel quality measured in each terminal. The present embodiment is an example of performing communication according to the OFDMA scheme, and therefore channel quality information is measured in each terminal in subcarrier units or in group units that each make a plurality of subcarriers as a group. Note that channel quality in group units uses as a representative value, an average value, minimum value or maximum value of the subcarriers belonging to each group.

Resource allocating section 109 allocates resources to each terminal based on the channel quality information and subband request information. Resource allocation information determined in resource allocating section 109 is outputted to resource allocation information adding section 111 and subcarrier mapping section 117. Further, resource allocating section 109 determines a value of transmission power of a subband based on the channel quality information and subband request information, and outputs the transmission power value to transmission power controlling section 110.

Resource allocation information adding section 111 adds resource allocation information, which is determined in resource allocating section 109 and which is addressed to each terminal, to a dedicated control signal addressed to each terminal.

Transmission power controlling section 110 controls transmission power of a subband by outputting the control signal matching the transmission power value, to subcarrier mapping section 117.

Channel quality measurement signal generating section 112 generates a channel quality measurement signal such that the channel quality measurement signal is transmitted from the subbands matching subband request information or from all subbands.

Adaptive modulating section 113 adaptively modulates dedicated data addressed to each terminal based on the channel quality information extracted in channel quality information extracting section 108, according to the coding rate and M-ary modulation value associated with channel quality measured in each terminal. Note that, in case where adaptive modulation is not performed, adaptive modulating section 113 may modulate dedicated data according to the predetermined M-ary modulation value and predetermined coding rate without using channel quality information. Modulating section 114 modulates a common control signal.

Interference measurement signal generating section 115 generates an interference measurement signal. As an interference measurement signal, interference measurement signal generating section 115 generates, for example, a pilot signal (also referred to as "reference signal"), a synchronization channel ("SCH") signal for establishing synchronization and a broadcast channel ("BCH") signal.

Cell identification information generating section 116 generates cell identification information to broadcast to terminals. As cell identification information, cell identification information generating section 116 generates the varying identification information unique to each cell (or each sector) such as a cell-specific ID.

Subcarrier mapping section 117 allocates a signal addressed to each terminal, to a subcarrier associated with a subband matching resource allocation information from resource allocating section 109. Further, subcarrier mapping section 117 maps signal points such that transmission power of each subband is controlled according to the control signal from transmission power controlling section 110.

IFFT section 118 transforms the frequency domain signal outputted from subcarrier mapping section 117 into a time domain signal, GI adding section 119 adds a guard interval to this time domain signal, and RF (Radio Frequency) transmitting section 120 performs predetermined radio processing such as up-conversion processing and down-conversion processing, so that the signal is transmitted from antenna 101.

Figure 3:
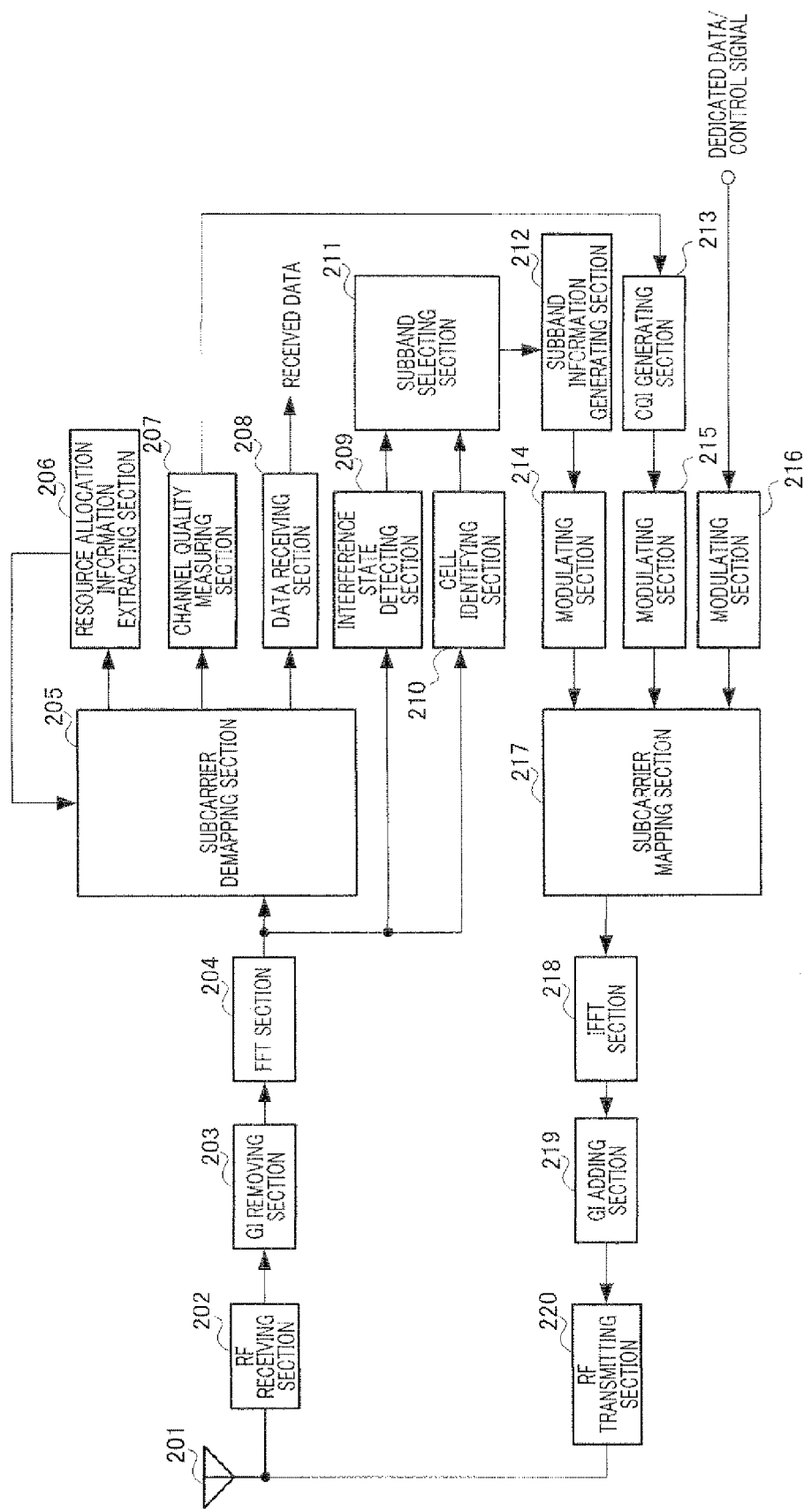
FIG. 3 is a block diagram showing the configuration of a terminal apparatus according to Embodiment 1 of the present invention.

FIG. 3 shows the configuration of a terminal. Terminal 200 inputs the signal received at antenna 201, to RF (Radio Frequency) receiving section 202. RF receiving section 202 performs predetermined radio processing such as amplification processing and down-conversion processing of the received signal. GI (Guard Interval) removing section 203 removes the guard interval from the received signal subjected to radio processing, and FFT section 204 transforms the time domain signal into a frequency domain signal. By this means, the signal of each subcarrier is reproduced.

Subcarrier demapping section 205 sorts the signal mapped on each subcarrier, to each subsequent circuit. To be more specific, subcarrier demapping section 205 outputs the signal of a subcarrier on which resource allocation information is mapped, to resource allocation information extracting section 206, the signal of a subcarrier on which a channel quality measurement signal is mapped, to channel quality measuring section 207, and the signal of a subcarrier on which dedicated data is mapped, to data receiving section 208.

Here, subcarrier demapping section 205 detects on which subcarrier (i.e. subband) channel quality measurement signal that must be outputted to channel quality measuring section 207 and dedicated data that must be outputted to data receiving section 208 are mapped, based on the resource allocation information extracted in resource allocation information extracting section 206, and outputs the signal of subcarriers (i.e. subbands) indicated by the resource allocation information, to channel quality measuring section 207 and data receiving section 208.

Channel quality measuring section 207 measures downlink channel quality based on the channel quality measurement signal transmitted from the base station. The present embodiment is an example of performing communication according to the OFDMA scheme, and therefore channel quality information is measured in each terminal in subcarrier units or in group units that each make a plurality of subcarriers as a group. Note that channel quality in group units uses as a representative value, an average value, minimum value or maximum value of the subcarriers belonging to each group.

Data receiving section 208 acquires received data by performing demodulation processing and error correction decoding processing of a data signal.

Interference state detecting section 209 measures the state of an inter-cell interference (D/U) from other cells (U) than the cell (D) to which the terminal 200 belongs to the cell (D) to which the terminal 200 belongs, based on the interference measurement signal S(k) transmitted from each base station. This will be explained in detail.

Figure 4:
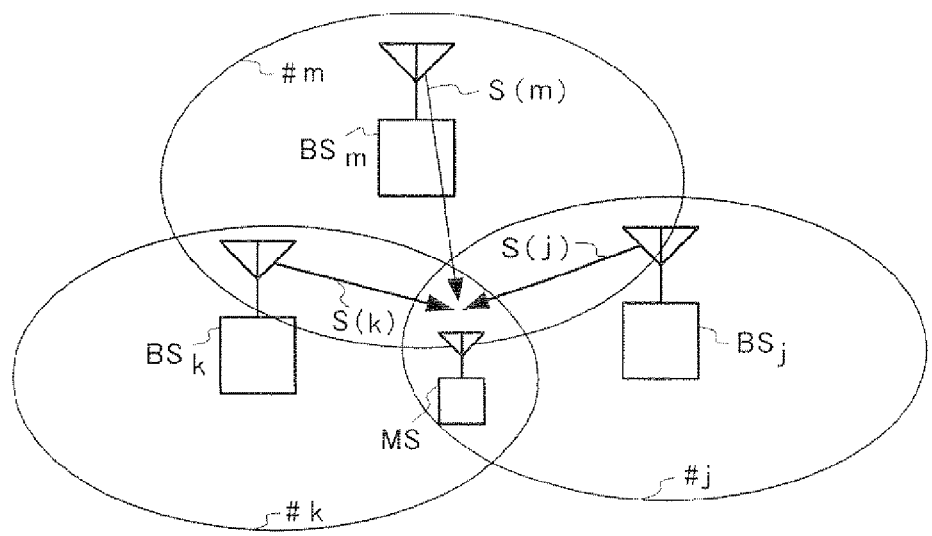
FIG. 4 illustrates measurement of an inter-cell interference state (D/U)

Assume the situation shown in FIG. 4. In this figure, the reference sign MS represents a terminal, and the reference sign BS represents a base station. The k-th base station transmits a measurement signal S(k). First, interference state detecting section 209 measures the received power level L(k) of the measurement signal S(k) transmitted from each base station. Here, k=1, . . . , $N_{BS}$ hold, and $N_{BS}$ is the number of surrounding base stations for which the received power level can be measured.

Interference state detecting section 209 finds the inter-cell interference state (D/U) according to the following equation using the measured received power level L(k). Further, the following equation assumes a case where the cell to which terminal 200 belongs is formed by the m-th base station.

(Equation 1)

$$D/U = \frac{L(m)}{\sum_{j=1, j \neq m}^{N_{BS}} L(j)} \quad [1]$$

Further, in case where the cell to which terminal 200 belongs has not been determined yet in the initial cell search, an inter-cell interference state (D/U) is determined according to the following equation assuming that the base station apparatus that makes the measurement signal reach the maximum received level (that is, $\max_k L(k)$) is in the cell to which terminal 200 belongs.

(Equation 2)

$$D/U = \frac{\max_k L(k)}{\sum_{j=1, j \neq m}^{N_{BS}} L(j)} \quad [2]$$

Although measurement values of all base stations $N_{BS}$ may be determined in the denominators of equation 1 and equation 2, it is equally possible to select higher measurement values in which interference is dominant and use only these measurement values.

Further, the measurement of the received power level L(k) using SCH is a known technique as disclosed in, for example, Non-Patent Document 3, and is performed by performing correlation calculation of a time domain waveform and a replica signal of SCH and determining this peak power as the received power level L(k). The detailed explanation will be omitted. Note that it is also possible to use BCH and a pilot signal in the same way. That is, correlation calculation of a time domain or frequency domain waveform and these replica signals is performed, and its peak power is determined as the received power level L(k).

Cell identifying section 210 acquires the cell ID of the cell to which terminal 200 currently belongs and the cell IDs of other cells (i.e. interfering cells) based on cell identification information transmitted from each base station. Further, cell identifying section 210 may calculate upon a cell search a correlation value of a received signal and a known correlation sequence assigned to each cell and detect the cell ID matching the correlation sequence, as the cell ID of terminal 200, assuming that terminal 200 currently belongs to the cell matching the correlation sequence from which the maximum correlation value is acquired. In this case, assuming that cells matching correlation sequences from which the second and third highest correlation values are acquired are other cells (i.e. interfering cells), cell IDs matching these correlation sequences are detected as interfering cell IDs.

Subband selecting section 211 selects a subband suitable for downlink communication, based on the cell ID to which terminal 200 belongs and interfering cell IDs identified in cell identifying section 210 and an inter-cell interference state (D/U) detected in interference state detecting section 209, and reports the selected subband to subband information generating section 212.

Subband information generating section 212 generates the index of the subband selected in subband selecting section 211, as a subband index ("SBI").

CQI (Channel Quality Indicator) generating section 213 generates CQI (Channel Quality Indicator) indicating downlink channel quality, based on the measurement result acquired in channel quality measuring section 207.

Modulating section 214 modulates the subband index ("SBI") acquired in subband information generating section 212, modulating section 215 modulates the CQI acquired in CQI generating section 213 and modulating section 216 modulates the dedicated data and control signal.

Subcarrier mapping section 217 maps each modulated signal on a predetermined subcarrier. IFFT section 218 transforms the frequency domain signal outputted from subcarrier mapping section 217 into a time domain signal, subsequent GI adding section 219 adds a guard interval to the time domain signal and RF (Radio Frequency) transmitting section 220 performs predetermined radio processing such as up-conversion processing and down-conversion processing of the time domain signal, so that the signal is transmitted from antenna 201.

(2) Operation

Next, the operations of base station 100 and terminal 200 according to the present embodiment will be explained.

(2-1) Operation of Entire System

Figure 5:
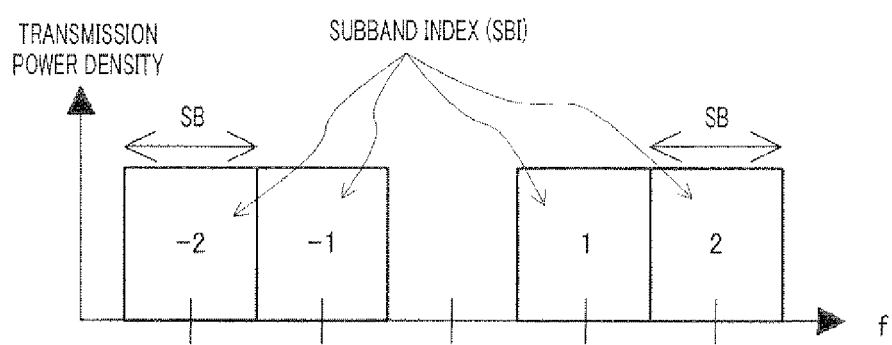
FIG. 5 illustrates subband indices ("SBIs")

In a communication system according to the present embodiment, as shown in FIG. 5, a band used in the communication system is divided into a plurality of subbands ("SBs") and a subband index ("SBI") is assigned to each divided subband. In case of FIG. 5, indices "−2," "−1," "1" and "2" are assigned sequentially from a subband of a lower frequency to a subband of a higher frequency. Note that, with the present embodiment, subband index ("SBI")=0 indicates all subcarriers (in case where data is transmitted using a subband overlapping the subband of SBI≠0, data transmission is performed by decreasing transmission power).

Terminal 200 detects an interference state based on a signal transmitted from base station 100, autonomously selects a subband suitable to downlink communication based on the detection result and reports the selected subband index ("SBI") to base station 100 (hereinafter, "SBI request"). Base station 100 allocates frequency resources based on the SBI request from terminal 200.

Selection of a subband in terminal 200 will be described in detail later and therefore will be briefly explained here. FIG. 6 shows how a subband is selected in terminal 200. Note that base stations BS1 and BS2 in FIG. 6D have the same configuration as base station 100 in FIG. 2, and terminals U1 to U3 have the same configuration as terminal 200 in FIG. 3.

As shown in FIG. 6D, terminal U1 is located near the center of the cell of base station BS1, terminal U2 is located near the cell edge of base station BS1 and terminal U3 is located near the cell edge of base station BS2. Further, base station BS1 and base station BS2 interfere with each other near the cell edges, and base station BS2 is the interfering base station with respect to terminal U2 and base station BS1 is the interfering base station with respect to terminal U3. In FIG. 6D, the reference numeral <1> indicates an interference measurement signal and cell identification signal, and each base station BS1 and BS2 transmits the interference measurement signal and cell identification signal. Further, the reference numeral <2> indicates the subband index ("SBI") determined by each terminal, and each terminal transmits this subband index as SBI request information to each base station BS1 and BS2 of the cell to which each terminal belong.

Terminal U1 decides that inter-cell interference can be ignored as a result of measuring an interference measurement signal, and transmits a subband index ("SBI")=0 to base station BS1. Then, as shown in FIG. 6A, base station BS1 transmits a data signal by assigning the data signal to all subbands such that the reuse factor becomes 1, or transmits the data signal using part of subbands included in SBI=0.

As a result of measuring an interference measurement signal, terminal U2 decides that inter-cell interference cannot be ignored, and transmits the subband index ("SBI")=−2 indicating a subband closer to a lower frequency side than to the center frequency, to base station BS1. Then, as shown in FIG. 6B, base station BS1 transmits a data signal by assigning the data signal to a subband of a lower frequency side indicated by the subband index=−2, or transmits the data signal using part of subbands included in SBI=−2.

As a result of measuring an interference measurement signal, terminal U3 decides that inter-cell interference cannot be ignored, and transmits the subband index ("SBI")=2 indicating a subband of a higher frequency side, to base station BS2. Then, as shown in FIG. 6C, base station BS2 transmits a data signal by assigning the data signal to subbands of a higher frequency side indicated by the subband index=2, or transmits the data signal using part of subbands included in SBI=2.

In this way, compared to terminal U2 and terminal U3 located at cell edges that are adjacent to each other, a subband of a lower frequency side is assigned to terminal U2 and a subband of a higher frequency side is assigned to terminal U3. By this means, interference at cell edges can be suppressed, so that it is possible to secure throughput at cell edges. Note that, in terminals U2 and U3 at cell edges at which inter-cell interference cannot be ignored, a device is required to autonomously select subbands that do not interfere with each other. The present embodiment makes a device such that each terminal selects a subband based on cell identification information and interference state so as to autonomously select a subband that does not cause inter-cell interference. This device will be described below.

As described above, the reuse factor 1 is used near the center of a cell at which inter-cell interference can be ignored and a terminal side autonomously selects subbands that do not interfere with each other, at cell edges at which inter-cell interference cannot be ignored, so that it is possible to secure throughput at cell edges causing little overhead (i.e. little delay) and realize adaptive FFR that improves the average throughput of a cell.

Figure 7:
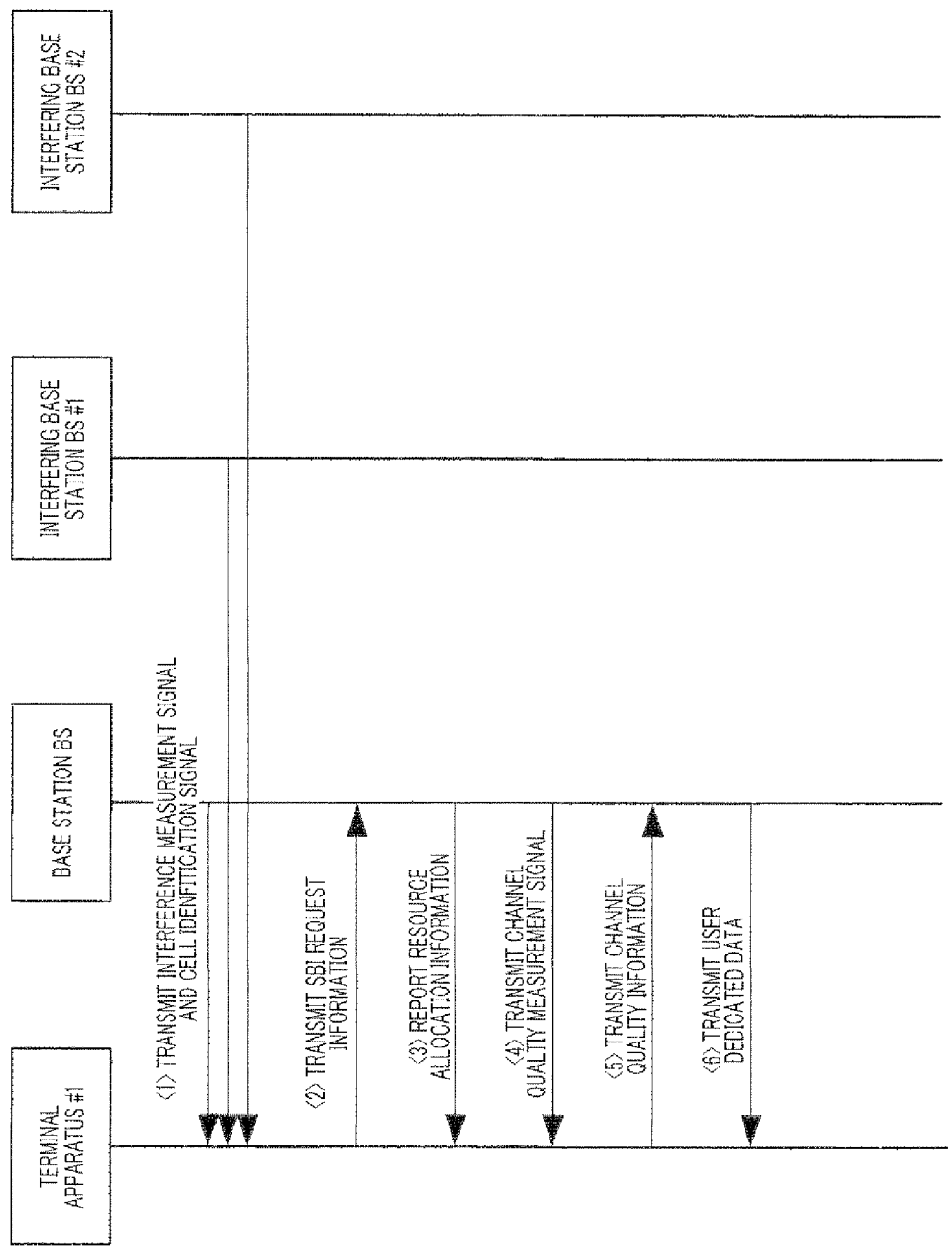
FIG. 7 shows the flow in which a base station transmits dedicated data in downlink to a terminal.

FIG. 7 shows the flow in which a base station transmits dedicated data to a terminal in downlink according to the present embodiment. Terminal apparatus 41 in FIG. 7 has the same configuration as terminal 200 in FIG. 3, and base station BS, interfering base station BS #1 and interfering base station BS #2 in FIG. 7 have the same configuration as base station 100 in FIG. 2.

First, in step <1>, base station BS (that is, a base station to which terminal apparatus #1 belongs), interfering base station BS #1 (that is, a base station to which terminal apparatus #1 does not belong) and interfering base station BS #2 (that is, a base station to which terminal apparatus #1 does not belong) transmit interference measurement signals and cell identification signals.

Next, in step <2>, terminal apparatus #1 selects a subband to which dedicated data addressed to terminal apparatus #1 needs to be assigned, based on the interference measurement signal and cell identification signal from each base station, and transmits a subband index ("SBI") request information indicating the selected subband, to base station BS.

Next, in step <3>, base station BS reports resource allocation information regarding terminal apparatus #1 (i.e. subband allocation information), which is determined based on the SBI request information from terminal apparatus #1, to terminal apparatus #1. Further, in step <4>, base station BS transmits a channel quality measurement signal using the determined subband. Here, the resource allocation information is transmitted to terminal apparatus #1 as a dedicated control signal. Further, base station BS transmits the dedicated control signal according to the SBI request information, and transmits the data signal according to the resource allocation information.

Next, in step <5>, terminal apparatus #1 transmits channel quality information measured based on the channel quality measurement signal, to base station BS.

Next, in step <6>, base station BS performs transmission power control and adaptive modulation based on channel quality information, and then transmits dedicated data to terminal apparatus #1.

(2-2) Selection of Subbands

Next, the operation of selecting a subband in subband selecting section 211 of terminal 200 according to the present embodiment will be explained. Terminal 200 selects a subband by executing roughly the following two steps.

Step 1: Determine Relative Positions of Subbands

The absolute value |fSB|(=|SBI|) of a subband ("SB") frequency is determined based on an inter-cell interference state (D/U) calculated from the output of interference state detecting section 209. To be more specific, when D/U (i.e. the inter-cell interference state) is smaller, the absolute value |fSB| of a subband frequency to select is made greater. By this means, when D/U (i.e. the inter-cell interference state) is smaller, it is possible to select a subband of a frequency that is more distant apart from the center frequency. Further, by increasing the number of divisions of a subband ("SB"), it is possible to reduce the probability of selecting the same subband ("SB"). Consequently, terminals at cell edges that receive dominant inter-cell interference from two base stations can autonomously select frequency subbands that are different and are distant apart from each other.

Figure 8A:
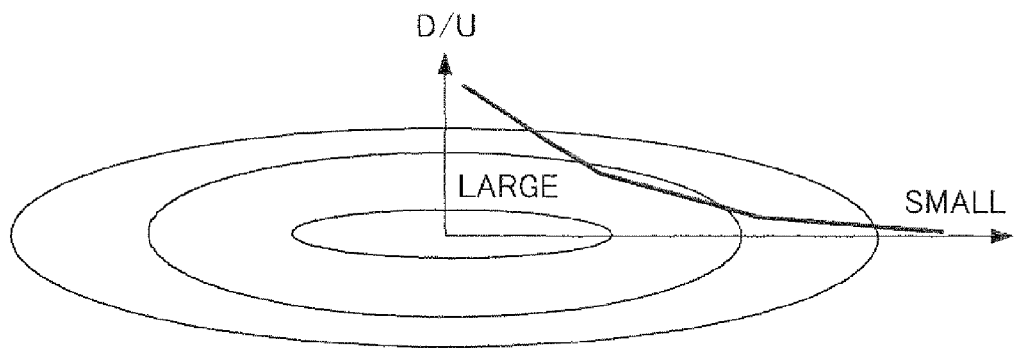
FIG. 8A shows stationary distribution of D/U in a cell.
Figure 8B:
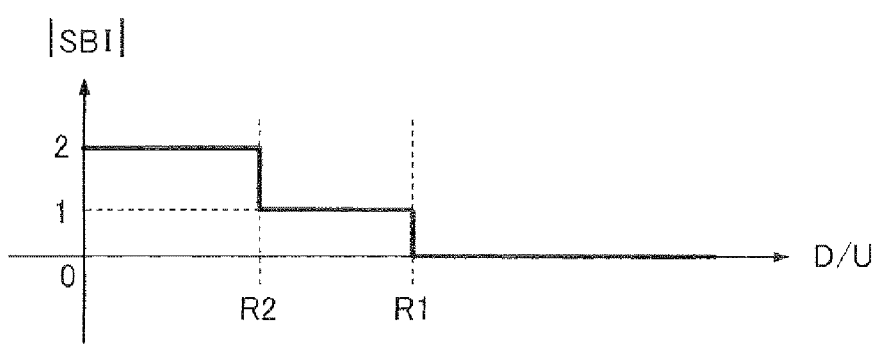
FIG. 8B shows selection of subbands based on D/U.

FIG. 8 shows how a subband is selected in step 1. FIG. 8A shows the state of a stationary inter-cell interference state (D/U) in a cell where D/U becomes smaller toward a cell edge, that is, inter-cell interference increases. FIG. 8B shows how a subband is selected based on D/U in step 1 where a subband index ("SBI") of the absolute value 0, 1 or 2 is selected based on decision thresholds R1 and R2.

Step 2: Determine the Absolute SB Positions (Determine the Signs of SBIs)

FIG. 9 shows how subbands are selected in step 2. Subband selecting section 211 detects a cell identifier (K) acquired in cell identifying section 210. Then, subband selecting section 211 determines the sign (±) of SBI based on identifier $K_D$ of the cell to which terminal 200 belongs and identifier $K_U$ of a cell other than the cell to which terminal 200 belongs. Further, if D/U is greater than a predetermined value (in case of FIG. 8D, R1) (that is, in case where it is possible to decide that interference from other cells is very small), it is possible to omit the operation of step 2. By this means, cell identifiers need not to be detected, so that it is possible to reduce power consumption of a terminal.

Here, when two base stations BS1 and BS2 are virtually isolated, interference from one other cell becomes dominant. With the present embodiment, sign $[(K_D-K_U)]$ of the difference $(K_D-K_U)$ between the identifier of the cell to which terminal 200 belongs and the identifier of the other cell which gives dominant interference. Here, assuming that cell identification signals detected in a terminal that belongs to one cell is $K_{D1}$ and $K_{U1}$ and cell identification signals detected in a terminal that belongs to the other cell are $K_{D2}$ and $K_{U2}$, the relationships $\text{sign}[(K_{D1}-K_{U1})]=-\text{sign}[(K_{D2}-K_{U2})]$, $K_{D1}=K_{U2}$ and $K_{D2}=K_{U1}$, hold.

By this means, as shown in FIG. 9B, terminal U1 that belongs to the cell (having cell identifier K=1) of base station BS1 in FIG. 9A selects a subband having a subband index "−2," and terminal U2 that belongs to a cell (having cell identifier K=2) of base station BS2 in FIG. 9A selects a subband having a subband index "2." As a result, terminals at cell edges that receive dominant inter-cell interference can autonomously select frequency subbands that are different and are distant apart from each other.

Further, with the present embodiment, in order to allow selection of the signs of subbands in this way, an identifier that varies between cells (or sectors) or a cell identifier that varies at least between neighboring cells is assigned to each cell.

(2-3) Transmission Power Control

As shown in FIG. 6A, in case where terminal 200 selects the subband index ("SBI")=0 indicating the subband including the center frequency, base station 100 performs downlink transmission using all subbands such that the reuse factor becomes 1 or performs downlink transmission using part of subbands included in SBI=0. That is, in ease where terminal 200 selects SBI=0, base station 100 improves frequency use efficiency by performing downlink transmission using the subband of SBI≠0.

Figure 10:
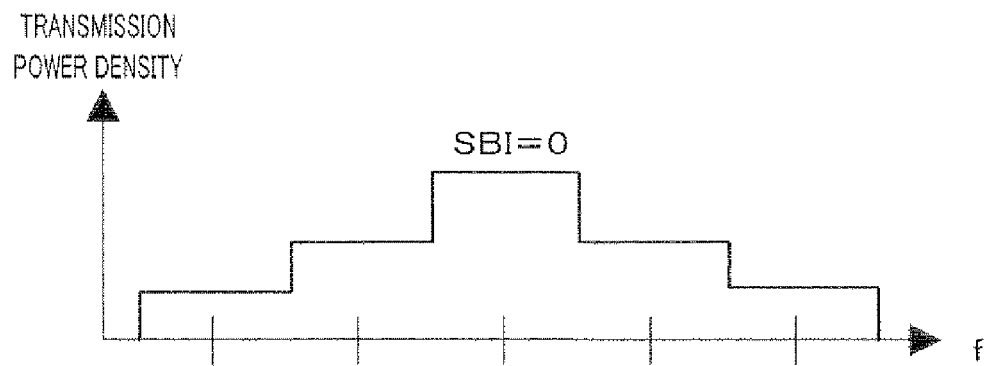
FIG. 10 shows an example of transmission power control in case where all subbands are selected.

At this time, as shown in FIG. 10, preferably, base station 100 performs transmission power control to decrease transmission power for a subband having a greater absolute value of a subband index ("SBI"), that is, a subband that is more distant apart from the center frequency. By so doing, in case where the reuse factor is made 1, it is possible to reduce interference upon terminals near cell edges of other cells.

The reason to do this is that, with the present embodiment, as shown in FIG. 8, a terminal at a cell edge that is more likely to receive interference selects a subband that is distant apart from the center frequency in step 1 of the above-described subband selection processing. In view of this, by decreasing more transmission power of a subband that is more distant apart from the center frequency, it is possible to suppress interference upon terminals at cell edges that are more likely to receive interference.

In this way, in transmission power control according to the present embodiment, in case of subband index ("SBI")=0, more transmission power is decreased for a subband that is more distant apart from the center frequency, so that it is possible to secure QoS for a terminal that requests SBI=0 and suppress interference upon terminals at cell edges that are more likely to receive interference.

(3) Advantage

As described above, according to the present embodiment, interference state detecting section 209 that detects interference states from other cells to the cell to which terminal 200 belongs; cell identifying section 210 that acquires an identification signal from each base station; and subband selecting section 211 that selects a subband to use in downlink transmission for terminal 200, based on the interference state detected in interference state detecting section 209 and an identification signal of each base station acquired in cell identifying section 210 are provided, so that a terminal apparatus can autonomously select a subband of little inter-cell interference and, consequently, it is possible to reduce inter-cell interference by adaptive FFR causing little delay.

Further, when interference from other cells to the cell to which terminal 200 belongs is significant, terminal 200 selects a subband that is distant apart from the center frequency toward a lower frequency side or higher frequency side, and, consequently, terminals that are more likely to interfere with each other select distant subbands, so that it is possible to suppress interference.

Furthermore, whether to select a subband of a lower frequency side or a subband of a higher frequency side from the center frequency is decided based on whether the cell ID of the cell to which terminal 200 belongs is greater than the cell IDs of the other cells, so that terminals can easily and accurately select subbands that do not interference with each other.

Still further, in case where interference from other cells to the cell to which terminal 200 belongs is equal to or less than a predetermined threshold, all subbands are selected (assuming SBI=0), thereby enabling downlink transmission using all bands, so that it is possible to improve frequency use efficiency. Note that it is equally possible to expand bands to select, toward both sides of the center frequency when interference from other cells to the cell to which terminal 200 belongs becomes more significant.

Further, according to the present embodiment, the synchronization channel ("SYNC CH") used in the initial cell search can be used to detect the interference state in downlink, so that it is possible to select a subband upon a cell search. Consequently, it is possible to perform downlink transmission (of control channel transmission and data channel transmission) after the cell search, while reducing inter-cell interference.

Figure 11:
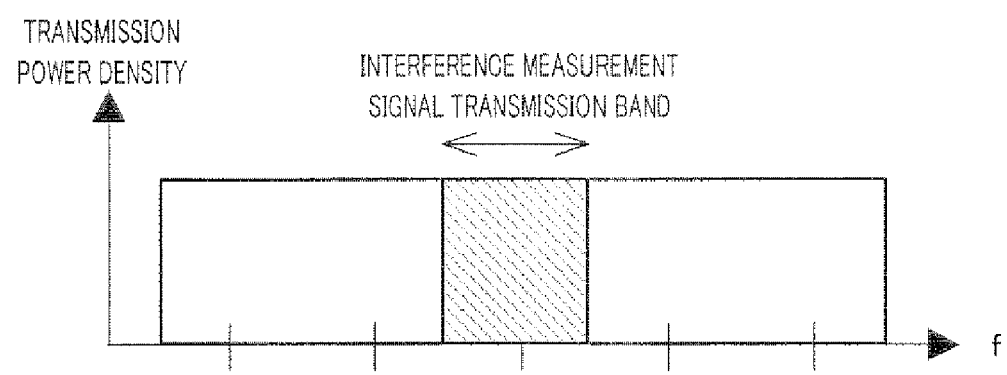
FIG. 11 shows an example of a transmission band of an interference measurement signal.
Figure 12A:
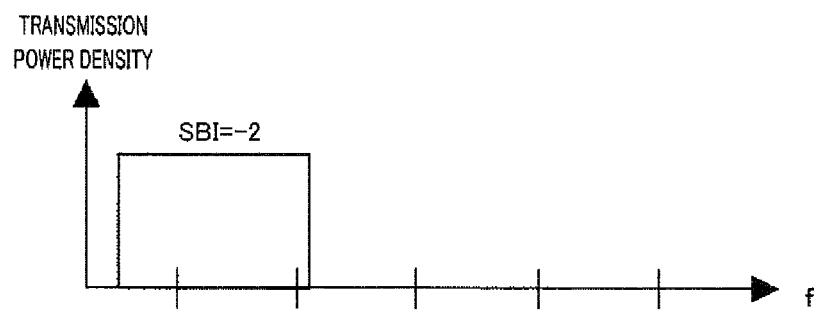
FIG. 12A shows the subband of SBI=−2.
Figure 12B:
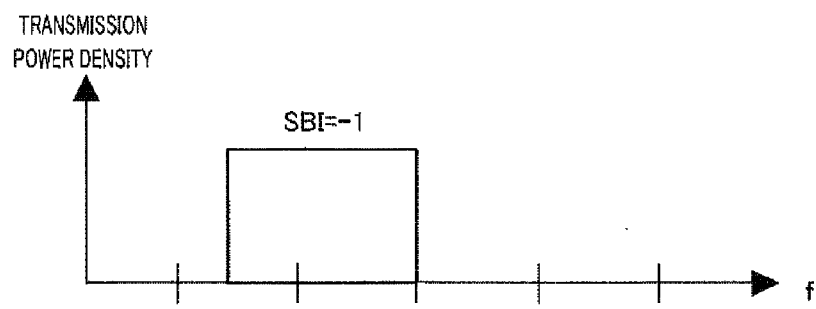
FIG. 12B shows the subband of SBI=−1.
Figure 12C:
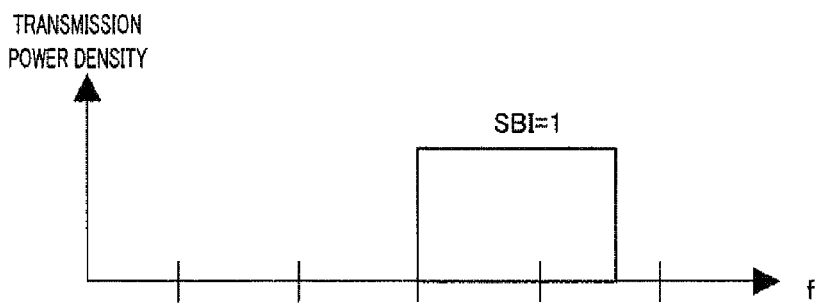
FIG. 12C shows the subband of SBI=1.
Figure 12D:
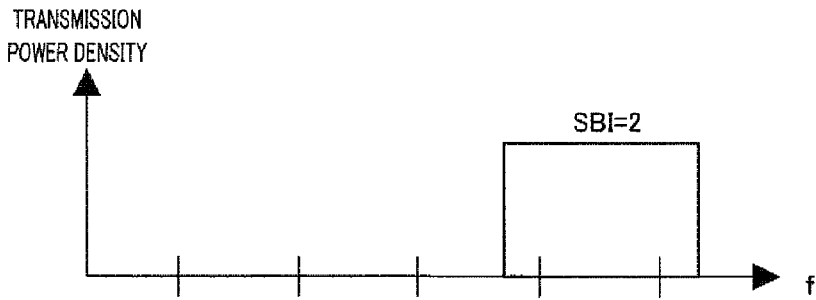
FIG. 12D shows the subband of SBI=2.

(4) Variation (4-1) Although in which band a base station transmits an interference measurement signal is not mentioned with the above embodiment, an interference measurement signal may be transmitted using the entire band of the communication system or may be transmitted using only part of the band as shown in FIG. 11. In case where transmission is performed using part of a band, a terminal only needs to select a subband using an interference state in a common specific band, as a representative value from each base station.

(4-2) Although, with the above embodiment, subbands indicated by subband indices ("SBIs"), are adjacent to each other, subbands indicated by subband indices ("SBIs") may partially overlap each other as shown in FIG. 12A to FIG. 12D. In this case, a terminal measures a sounding signal for measuring a downlink quality state (that is, a channel quality measurement signal that is generated in channel quality measurement signal generating section 112 and that is transmitted from a base station) in a wider bandwidth than a partial band in which communication is performed, it is possible to select a band of good SINR (Signal-to-Interference and Noise Ratio), so that it is possible to perform adaptive modulation based on CQI using the partial band in which inter-cell interference is reduced. By this means, it is possible to improve downlink received quality of dedicated data and improve system throughput. This is an effective counter measure particularly when there are a plurality of interfering base stations of significant interference levels.

Figure 13A:
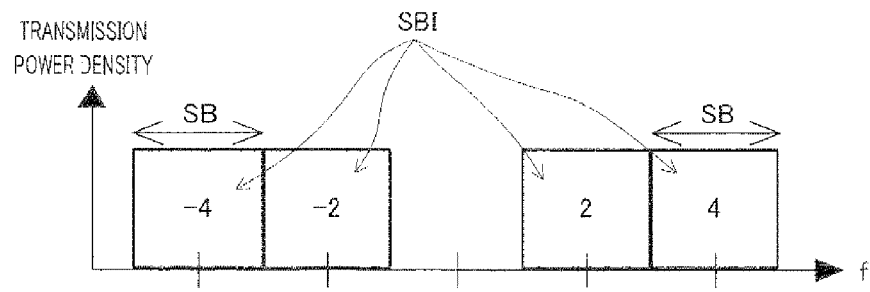
FIG. 13A shows subbands of SBI=−4, −2, 2 and 4.
Figure 13B:
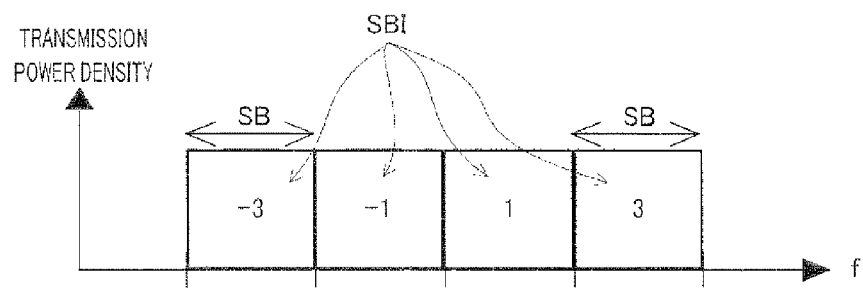
FIG. 13B shows subbands of SBI=−3, −1, 1 and 3.

Further, by overlapping subbands indicated by subbands indices ("SBIs") as shown in FIG. 13A and FIG. 13B, it is possible to increase the number of subbands. By so doing, in case where interference from a plurality of other cells is dominant, it is possible to reduce the probability of selecting the same subband. That is, in case where cell identification signals detected in a terminal that belongs to one cell are $K_{D1}$ and $K_{U1}$, cell identification signals detected in a terminal that belongs to the other cell are $K_{D2}$ and $K_{U2}$, sign$[(K_{D1}-K_{U1})]$=sign$[(K_{D2}-K_{U2})]$, $K_{D1} \neq K_{U2}$, and $K_{D2} \neq K_{U1}$, it is possible to increase the probability of selecting different subbands between terminals.

Further, a method of dividing subbands may vary between transmission of a dedicated control signal and transmission of a dedicated data signal. In this case, as to a control signal for which CQI is not measured, by using a method of dividing subbands such that the subbands do not overlap, it is possible to transmit the control signal of reduced interference.

Figure 14A:
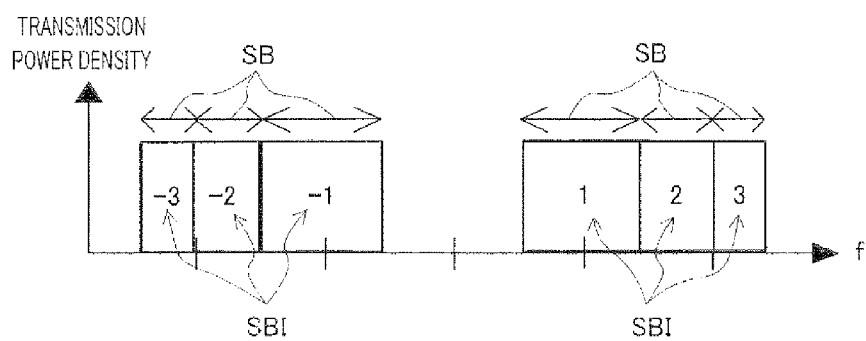
FIG. 14A shows the subbands of SBI=−3, −2, −1, 1, 2 and 3.
Figure 14B:
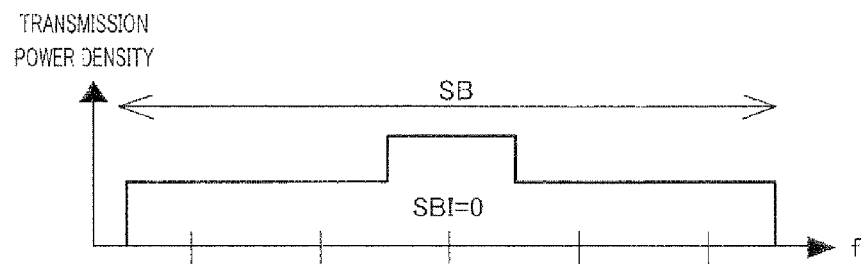
FIG. 14B shows a subband of SBI=0.

Further, as shown in FIG. 14, the subband width indicated by each subband index ("SBI") may be varied as another method of dividing subbands. In this case, it is preferable to make a subband width narrower for a field having smaller D/U. By so doing, in case where interference from a plurality of other cells is dominant, it is possible to reduce the probability of selecting the same subband.

Further, preferably, the base station varies the subband width over time according to the frequency of subband requests from terminals. For example, in case where the frequency of subband requests for a specific subband from terminals in a cell is high, the subband width of the corresponding subband index ("SBI") is increased. By this means, it is possible to prevent the decrease in frequency use efficiency due to concentration of subband requests for a specific subband that occurs when terminals in a cell concentrate on a specific area near a cell edge. Preferably, the subband width is increased such that the subband width do not cross the domain of SBI>0 and a domain of SBI<0. In this way, in case where the subband width is varied, the base station reports (i.e. signaling) to terminals that a level decision threshold of an interference state is made variable. For example, by reporting (i.e. signaling) that decision threshold (Rk) is made variable in above-described step 1 of selecting a subband, it is possible to provide the same advantage similar to the advantage of distributing the load of subband requests.

Figure 15A:
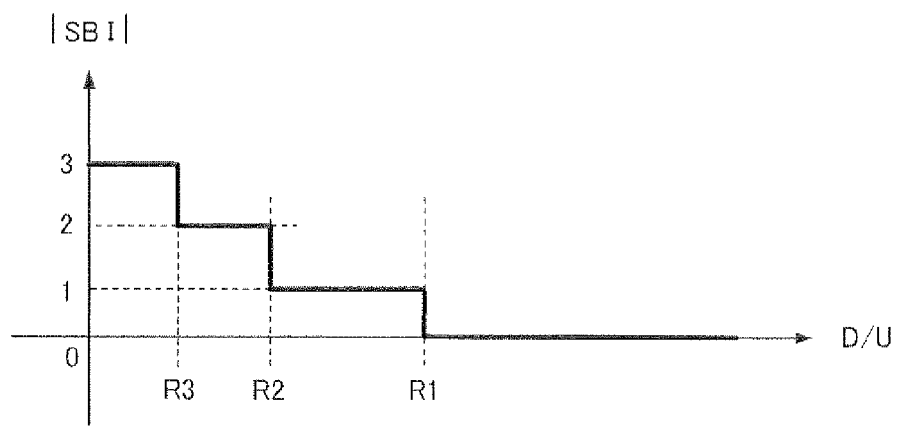
FIG. 15A shows threshold decision based on D/U.
Figure 15B:
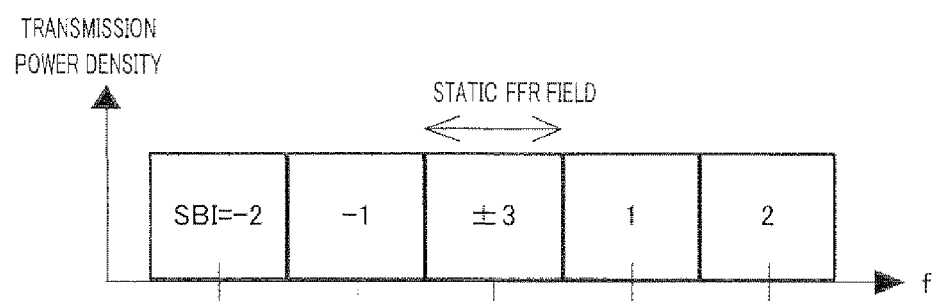
FIG. 15B shows a configuration example of an adaptive FFR field and a static FFR field.
Figure 15C:
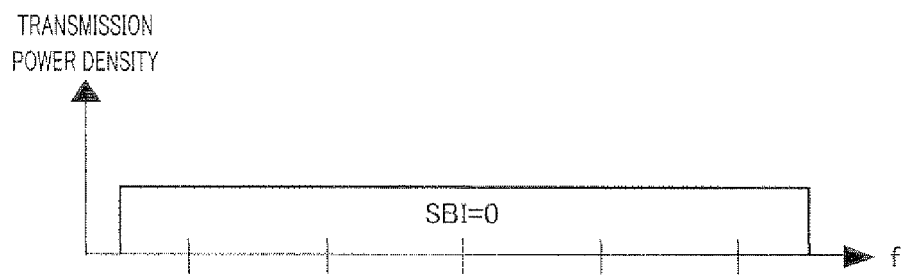
FIG. 15C shows a subband of SBI=0.

(4-3) Cases might occur where a subband that cannot avoid interference is selected depending on the cell identifiers and interference states of base stations in the surrounding cells. This takes place in case where there are two or more dominant interfering base stations having the same level as the received level of the base station of the cell to which the terminal belongs. In this case, it is possible to avoid interference by assigning a subband employing a configuration that combines an adaptive FFR field and static FFR field as follows. That is, as shown in FIG. 15A, in a field in which D/U is smaller than a predetermined value (R3) (i.e. a field in which inter-cell interference is very significant), subbands subjected to frequency allocation between surrounding base stations in advance are used such that inter-cell interference does not occur. In this case, as shown in, for example, FIG. 15B, the terminal only needs to select and transmit subband index ("SBI")=±3 to the base station. By contrast with this, in a field in which D/U is greater than R3 and smaller than R1 (i.e. a field in which inter-cell interference cannot be ignored), subbands are assigned based on adaptive FFR explained in the present embodiment.

(4-4) As an interference measurement signal, it is preferable to use the synchronization channel ("SYNC CH") used in the initial cell search. By so doing, the terminal can select a subband upon a cell search. Next, the terminal adds the selected subband request information to a signal (i.e. RACH: Random Access Channel) for requesting communication by random access, and transmits the signal to the base station. The base station receives RACH including the subband request information from the terminal, and, consequently, can transmit a dedicated control channel using a specified subband. Further, it is possible to allocate frequency resources for dedicated data, based on a subband index. By so doing, it is possible to perform downlink (i.e. control channel and data channel) transmission after RACH transmission subsequent to a cell search, while reducing inter-cell interference.

(4-5) Although the terminal transmits SBI request information in step <2> of FIG. 7 using an uplink channel (for example, RACH), in this case, the terminal may transmit SBI request information using an uplink subband matching the selected SBI (which refers to a subband that is applicable in case where the relationship of relative positions of subbands is stored and the same SBI as in downlink is assigned to uplink) instead of using a specific subband. By this means, even when the number of terminals accommodated in a cell is great, the base station can efficiently receive SBI request information. Further, by using for uplink transmission the same subband requested by an SBI request in downlink, transmission of reduced inter-cell interference is possible in uplink, so that it is possible to improve received quality of a signal transmitted in uplink. Furthermore, by this means, uplink subbands are distributed in the frequency domain, so that the base station can efficiently accommodate terminals.

Still further, a terminal may transmit channel quality information in step <5> of FIG. 7 using an uplink subband matching the selected SBI. By this means, it is possible to improve received quality of channel quality information. Further, even when the number of terminals accommodated in a cell is great, uplink subbands are distributed in the frequency domain, so that the base station can efficiently receive channel quality information.

Further, as a different method for (4-5), there is a method of transmitting RACH using an uplink subband matching the selected SBI. By this means, the terminal can omit transmission of SBI request information in step <2> of FIG. 7. This is because SBI request information can be detected from a subband in which RACH has been transmitted. Further, user-specific data may be transmitted in uplink using the same subband after RACH transmission. By so doing, SBI request information needs not to be transmitted, so that it is possible to provide an advantage of reducing inter-cell interference and advantage of reducing the overhead. Further, as a result, RACH and data can be transmitted even in uplink while reducing inter-cell interference, so that it is possible to improve received quality of a signal transmitted in uplink.

(4-6) The interference states of other cells change depending on the movement of terminals and the movement of the surroundings. Therefore, the base station transmits an interference measurement signal on a regular basis, and a terminal detects an interference state based on the interference measurement signal to transmit an SBI change request. By this means, it is possible to support variation of the interference state over time. A terminal may update an SBI change request on a regular basis to transmit to the base station, or may update the SBI change request only when the SBI change request changes, to transmit to the base station. By updating the SBI change request only when the SBI change request changes, to transmit to the base station, even if the number of terminals accommodated in a cell increases, it is possible to reduce the overhead due to the SBI change request.

(4-7) When a base station transmits an interference measurement signal, the base station transmits an interference measurement signal using TDD, FDD or CDM such that the interference state of the cell to which that terminal belongs and interference states of other cells can be detected separately. Further, it is also possible to use a plurality of interference measurement signals. For example, a synchronization channel ("SCH") that is used near the center frequency of the operating communication band and a reference signal (i.e. pilot signal) that is transmitted using all operating communication bands may be used as interference measurement signals. In this case, a terminal measures instantaneous interference (that is, finds a short time average) using a synchronizing channel, and transmits SBI request information to the base station based on this measurement result. Next, the terminal averages an interference state per subband for a long time using a reference signal (that is, finds a long time average) and measures the interference state per band, selects the subband of the least interference and transmits SBI request information to the base station. In this way, the terminal may measure the amount of interference based on different kinds of interference measurement signals, select a subband based on each measurement result and transmit SBI request information matching each selection result. In this case, the base station side only needs to allocate resources taking a plurality of items of SBI request information into account.

(4-8) After receiving a plurality of items of SBI request information from terminals, the base station coordinates between cells the timings to reflect resource allocation based on SBIs. By this means, even if a received level of a cell to which a terminal belongs and received levels of the other cells do not match in this terminal, this terminal can detect the interference state. Further, in case where a terminal measures inter-cell interference a plurality of times during a period in which resource allocation based on SBIs is reflected, the terminal may select a subband by averaging a plurality of measurement results. By this means, terminals can select much better subbands.

Embodiment 2

With the present embodiment, another method of selecting subband indices ("SBIs") in a terminal will be explained. Although, with Embodiment 1, relative positions of subbands are determined according to the interference state (D/U) in step 1 of selecting subbands, selection is performed in step 1 of the present embodiment in a different way from Embodiment 1.

With the present embodiment, the subband selecting section of terminal 200 selects a subband by executing roughly following two steps.

Step 1: Determine Relative Positions of Subbands

Based on an inter-cell interference state (D/U) calculated from the output of the interference state detecting section and information about a cell identifier outputted from the cell identifying section, the relative positions of subbands are determined.

Figure 16:
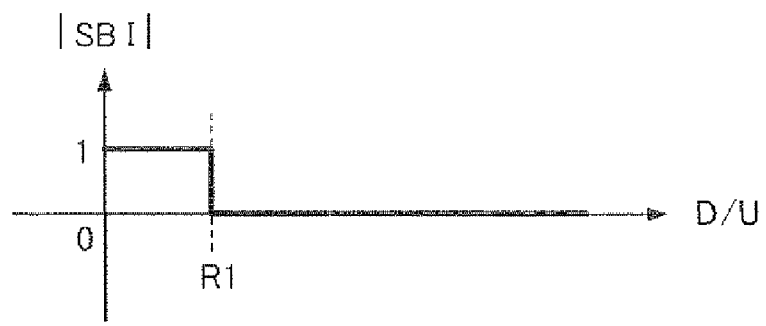
FIG. 16 shows threshold decision based on D/U.

To be more specific, first, based on the inter-cell interference state (D/U) calculated from the output of the interference state detecting section, the absolute value $|fSB|(=|SBI|)$ of a subband ("SB") frequency is determined. Next, as shown in FIG. 16, following selection (1) and (2) are performed.

(1) If D/U≧predetermined value R1, SBI=0 is selected based on the decision of a situation where inter-cell interference can be ignored.

(2) If D/U<predetermined value R1, $|SBI|\geq 1$ is selected based on the decision of a situation where inter-cell interference cannot be ignored.

Next, if $|SBI|\geq 1$ is selected, $|SBI|$ is determined by finding the difference between the absolute values of cell IDs based on information about the cell identifier outputted from the cell identifying section and by performing the modulo operation represented by the following equation.

$$|SBI|=\mathrm{mod}\,[|(\text{cell ID of base station }\mathbf{100})-(\text{cell IDs of interfering base stations})|,Ns]+1 \qquad (\text{Equation 3})$$

Here, in equation 3, Ns means Ns=max|SBI| and mod [y,x] means the reminder of y/x.

In this way, a subband is selected based on identifiers of surrounding base stations.

Further, instead of equation 3, $|SBI|$ may be determined using the following equation.

$$|SBI|=\text{random}[1,Ns] \qquad (\text{Equation 4})$$

Here, in equation 4, random[x,y] means a function of producing an integer value equal to or greater than x and equal to or less than y at random.

Step 2: Determine Absolute SB Positions (Determine Signs of SBIs)

The signs of subbands are selected by executing the same processing as in Embodiment 1.

According to the present embodiment, similar to Embodiment 1, a terminal can autonomously select a subband that can suppress interference from other cells.

Further, a method of selecting a subband according to the present embodiment is applicable to the following embodiments.

Embodiment 3

With the present embodiment, a subband control method that is suitably applied to a mobile communication system including terminals of low capability will be explained.

The next-generation mobile communication system allows high speed data communication exceeding 100 Mbps by widening an operating frequency bandwidth. In this case, taking into account cost requirement, power consumption requirement and backward compatibility requirement of terminals, it is assumed that terminals having different levels of reception capability (i.e. modulation schemes that can be supported, coding schemes, the maximum bandwidth that can be received and the maximum bandwidth that can be transmitted) are provided depending on use of terminals without equipping all terminals with the functions of full specifications. Therefore, the next-generation mobile communication system must efficiently accommodate terminals having various levels of reception capability.

The present embodiment presents a method of realizing adaptive FFR of little overhead (i.e. processing delay) in the system even when terminals of low capability employing operating communication bands that cannot be covered by the maximum bandwidth which can be received or the maximum bandwidth that can be transmitted. Only different parts from Embodiment 1 will be explained below.

[Transmission Band of an Interference Measurement Signal]

The minimum bandwidth in the class of maximum bandwidths that a terminal can receive is set as the transmission bandwidth for an interference measurement signal. That is, base station 100 transmits an interference measurement signal of a bandwidth matching the bandwidth that the terminal of the lowest capability in the terminals included in the system can receive.

Figure 17:
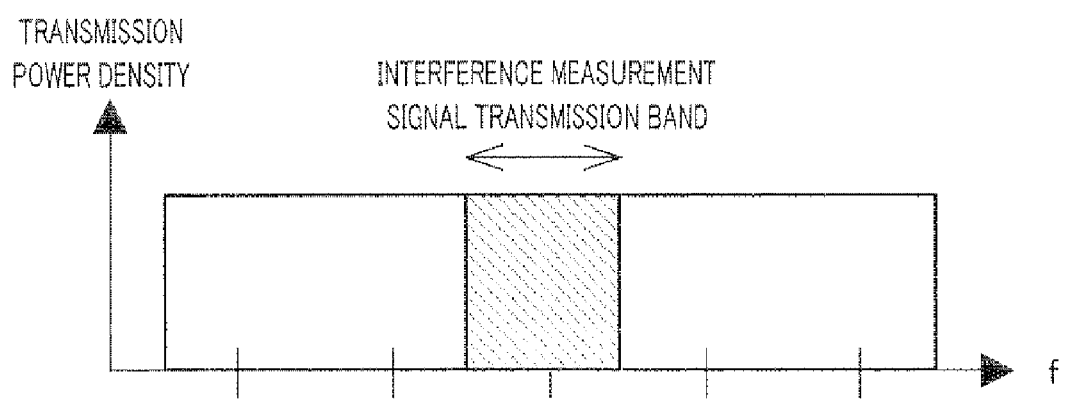
FIG. 17 shows the state of an interference measurement signal transmitted from a base station.
Figure 18:
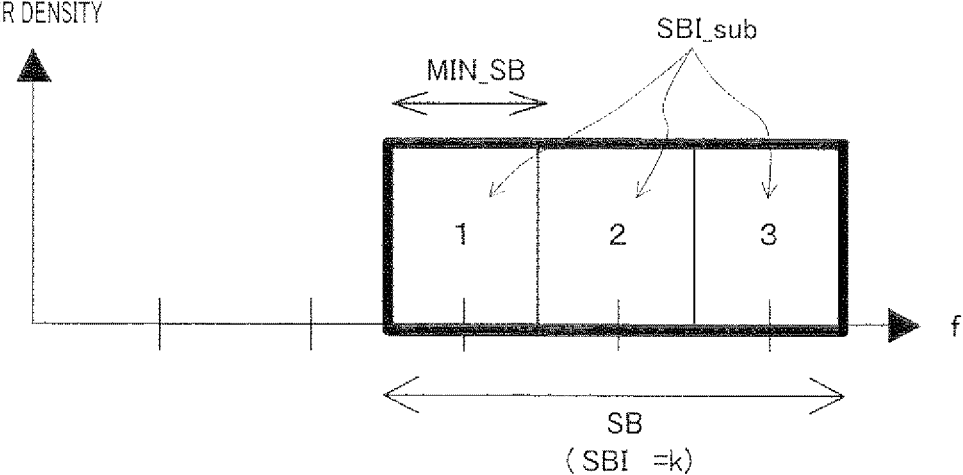
FIG. 18 shows a case where a subband indicated by a subband index ("SBI") is divided smaller.

FIG. 17 shows the state of an interference measurement signal transmitted from the base station.

[Transmission of Capability Information]

When SBI request information is transmitted in step <2> of FIG. 7, the terminal reports the following capability information to the base station.

The terminal reports the maximum bandwidth information (i.e. reception capability information) that the terminal can receive, to the base station.

The terminal reports the maximum bandwidth information (i.e. transmission capability information) that the terminal can transmit, to the base station.

[Setting of the Bandwidth of a Subband]

Assume that the minimum bandwidth in the class of maximum bandwidths that the terminal can receive is the minimum subband unit (MIN_SB). As the bandwidth of a subband, the minimum subband unit MIN_SB or an integral multiple of MIN_SB is set.

In case where the bandwidth of a subband is an integral multiple of MIN_SB, INDEX (SBI_sub) related to bands obtained by dividing a subband smaller is added.

In step <3> of FIG. 7, a dedicated control signal including not only subband index ("SBI") information but also sub-index (SBI_sub) information about the subband as resource allocation information, is reported. When allocation information of a channel quality measurement signal is transmitted, this allocation information is reported in the same way. In case where the bandwidth of a subband is an integral multiple of MIN_SB, allocation information about the dedicated control signal and channel quality measurement signal is transmitted using SBI_sub determined in advance. By this means, even a terminal of low capability can receive allocation information about the dedicated control signal and channel quality measurement signal. The terminal receives dedicated data based on this information. In this way, even a terminal of low capability can receive dedicated data.

Note that information about a channel quality measurement signal may be transmitted using a plurality of sub-indices that do not exceed transmission capability of the terminal. Frequency resource allocation in the base station is performed by allowing part of subbands requested by the terminal or all subbands. Further, preferably, frequency resource allocation is performed by assigning predetermined numbers in subcarrier units or subcarrier group units in a subband.

According to the method of setting the bandwidth of a subband explained above, index (SBI_sub) information related to a band obtained by dividing a subband smaller is added to subband index ("SBI") information to support a terminal of low capability, so that, even in a mobile communication system including terminals of low capability, terminals can perform autonomous subband selection processing as explained in Embodiment 1. Further, SBI_sub information is added to SBI information, so that it is possible to represent a band obtained by dividing a subband smaller, using a small number of bits.

Figure 19:
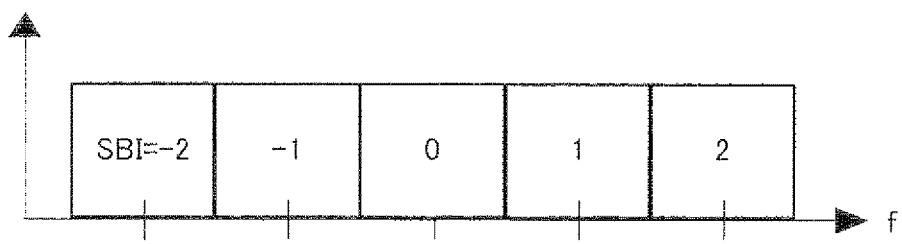
FIG. 19 shows a case where SBI=0 is associated with the subband in the center.

Further, although the terminal transmits SBI request information in step <2> of FIG. 7 using an uplink channel (for example, RACH), in this case, the terminal may transmit SBI request information using an uplink subband matching the selected SBI instead of using a specific subband. In this case, the relationship between the relative positions of downlink SBIs and uplink SBIs is made the same. Here, preferably, as shown in FIG. 19, if SBI=0, only subbands around the center are assigned in uplink.

Here, the setting of the bandwidth of a subband in uplink will be briefly explained. Assume that the minimum bandwidth in the class of the maximum bandwidths that the terminal can transmit is the minimum subband unit (MIN_SB_UP) in uplink. By this means, even when a number of terminals accommodated in a cell is great, the base station can efficiently receive SBI request information. Further, by using in uplink the same subband requested by the SBI request in downlink, transmission of reduced inter-cell interference is possible even in uplink, so that it is possible to improve received quality of signals transmitted in uplink. By this means, subbands in uplink are distributed in the frequency domain, so that the base station can efficiently accommodate terminals. Moreover, the base station can efficiently accommodate even terminals of low transmission capability.

Embodiment 4

The present embodiment presents how to change subbands upon retransmission and presents a method of assigning subbands upon retransmission.

Figure 20:
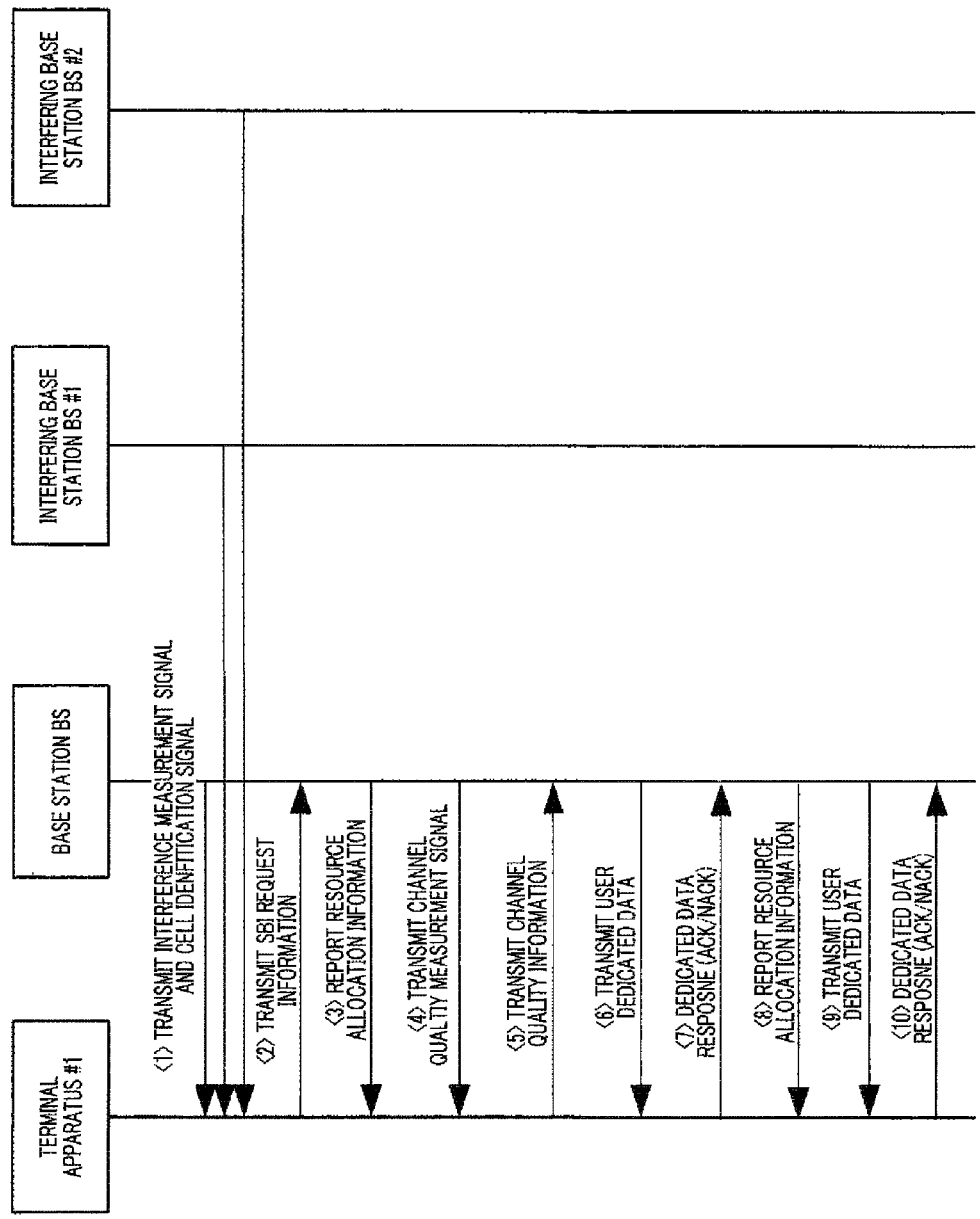
FIG. 20 shows communication steps according to Embodiment 4.

FIG. 20 shows communication steps according to the present embodiment. The processing from step <1> to step <6> is the same as in FIG. 7 explained in Embodiment 1, and therefore explanation thereof will be omitted.

In step <7>, a terminal transmits an acknowledgement ("ACK") if a signal from the base station is successfully received, or transmits a negative acknowledgement ("NACK") if a signal from the base station is not successfully received.

When receiving a negative acknowledgement ("NACK") from the terminal, the base station retransmits data. Regarding this case, the present embodiment proposes the following two retransmission methods.

[Retransmitting Method 1]

After transmitting a NACK signal, the terminal selects a subband again, and transmits SBI request information to the base station. That is, after transmitting a NACK signal in step <7>, the step returns to step <2> to re-execute the steps subsequent to step <2>. Here, as described above, there are the following two methods as the method of selecting SBIs. (1) The terminal selects an SBI again, and reports the selected SBI to the base station. (2) The terminal selects an SBI again using the result of measuring the interference state per subband, and transmits the selected SBI to the base station.

[Retransmitting Method 2]

When receiving a NACK from the terminal, the base station transmits a dedicated user signal using a subband different from the subband selected by the terminal. That is, in step <8>, the base station reports to the terminal resource allocation information different from the subband selected by the terminal, and, in step <9>, assigns dedicated data to the subband indicated by this resource allocation information and transmits the dedicated data. Further, the resource allocation information in step <8> is reported to the terminal as a dedicated control signal using the subband selected so far.

Here, there are, for example, the following two methods (1) and (2) as the method of, in the base station, re-assigning subbands that are different from the subband selected in the terminal.

(1) The base station uses the predetermined changing method. (2) The base station assigns subbands of little load applied by SBI requests of terminals. Until the terminal transmits an ACK, the steps of the above-described [retransmitting method 1] or [retransmitting method 2] are repeated.

Embodiment 5

A case will be explained with the present embodiment where the frequency resource allocation method according to the present invention is applied to an uplink sounding signal. With the present embodiment, the terminal takes the initiative to perform sounding of reduced interference. To be more specific, the terminal changes the transmission band of a sounding signal based on a subband request.

Although downlink communication has been explained with Embodiment 1, the same concept as Embodiment 1 is applicable to uplink communication. This concept is applicable even in the TDD system and FDD system.

[Setting of Uplink Subbands]

The relationship between relative positions of downlink SBIs and uplink SBIs is made the same. Note that the widths of subbands may not be the same. Further, if SBI=0, only the subband in the center is assigned.

[Communication Steps in Uplink]

Figure 21:
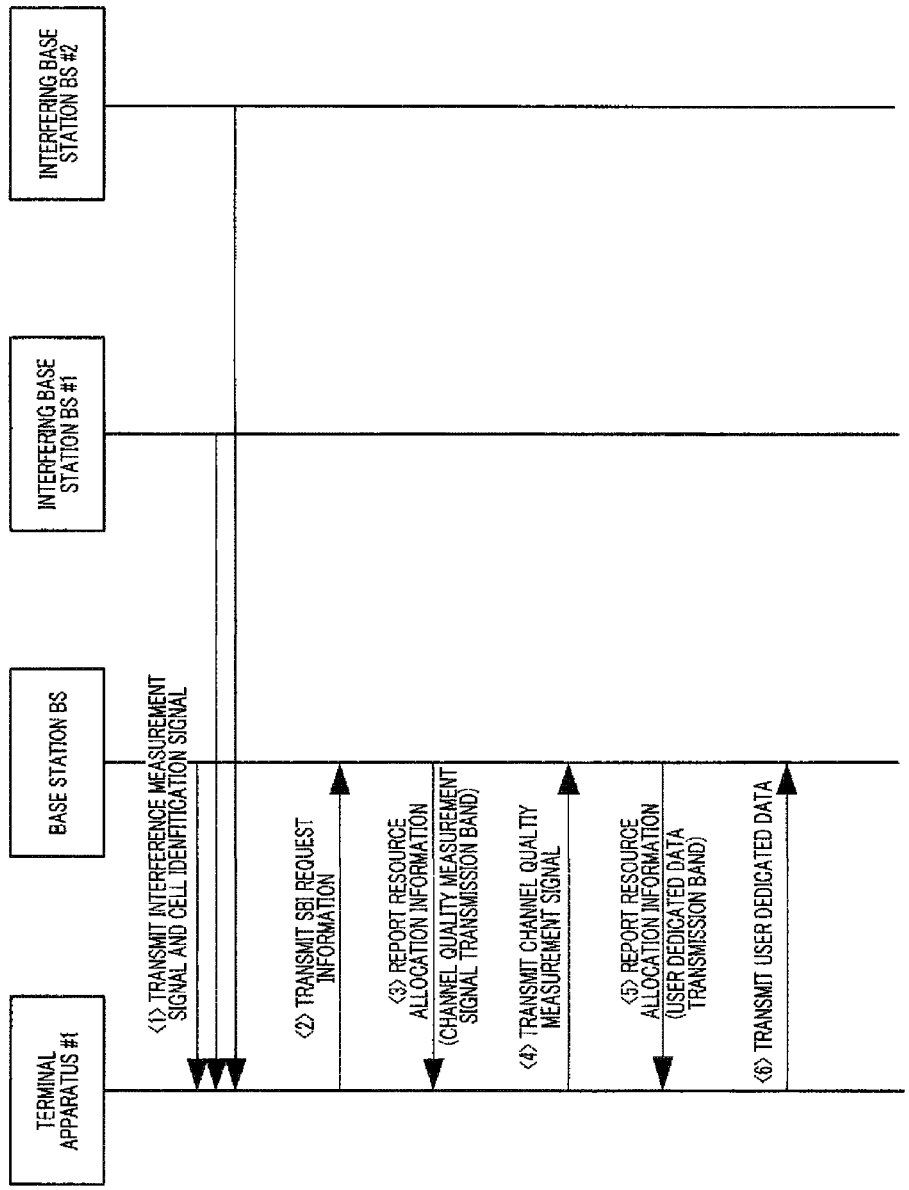
FIG. 21 shows communication steps according to Embodiment 5.

FIG. 21 shows communication steps in uplink. Only different parts from Embodiment 1 will be explained below.

Step <1>: This step is the same as in Embodiment 1.

Step <2>: The terminal transmits SBI request information to the base station assuming that inter-cell interference state in downlink is the same even in uplink. The operation is the same as in Embodiment 1.

Step <3>: Based on the SBI request information, the base station reports to the terminal the resource allocation information for assigning a transmission band of a channel quality measurement signal in uplink.

Step <4>: The terminal transmits the channel quality measurement signal based on the resource allocation information.

Step <5>: Based on the channel quality measurement result, the base station determines the transmission band of user-specific dedicated data, and reports the transmission band to the terminal as resource allocation information.

Step <6>: The terminal transmits user-specific dedicated data, based on the specified resource allocation information.

As described above, assuming that the inter-cell interference state in downlink is the same even in uplink, the transmission band of a channel quality measurement signal in uplink is determined based on the subband index ("SBI") selected by the terminal, so that the base station can accurately measure channel quality based on the channel quality measurement signal of reduced inter-cell interference. Further, the base station determines the data transmission band in uplink based on this accurate measurement result, and, consequently, can accurately determine the data transmission band in uplink.

Figure 22:
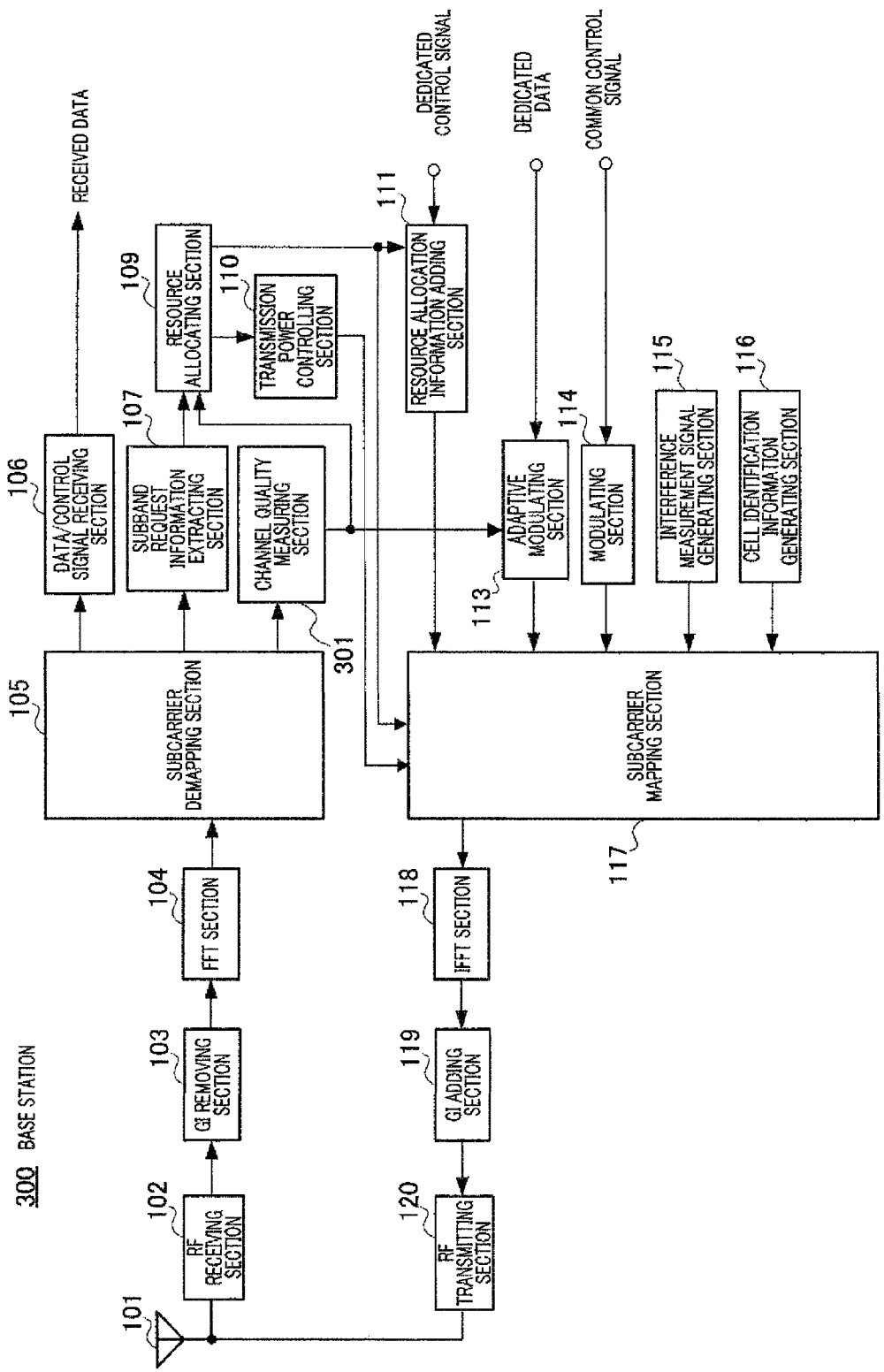
FIG. 22 is a block diagram showing the configuration of a base station apparatus according to Embodiment 5.

FIG. 22 in which the same components as in FIG. 2 are assigned the same reference numerals shows the configuration of the base station that implements the above steps according to the present embodiment. Compared to base station 100 in FIG. 2, base station 300 in FIG. 22 has the same configuration as base station 100 in FIG. 2 except for that channel quality measuring section 301 is provided instead of channel quality information extracting section 108 and channel quality measurement signal generating section 112 is removed.

Figure 23:
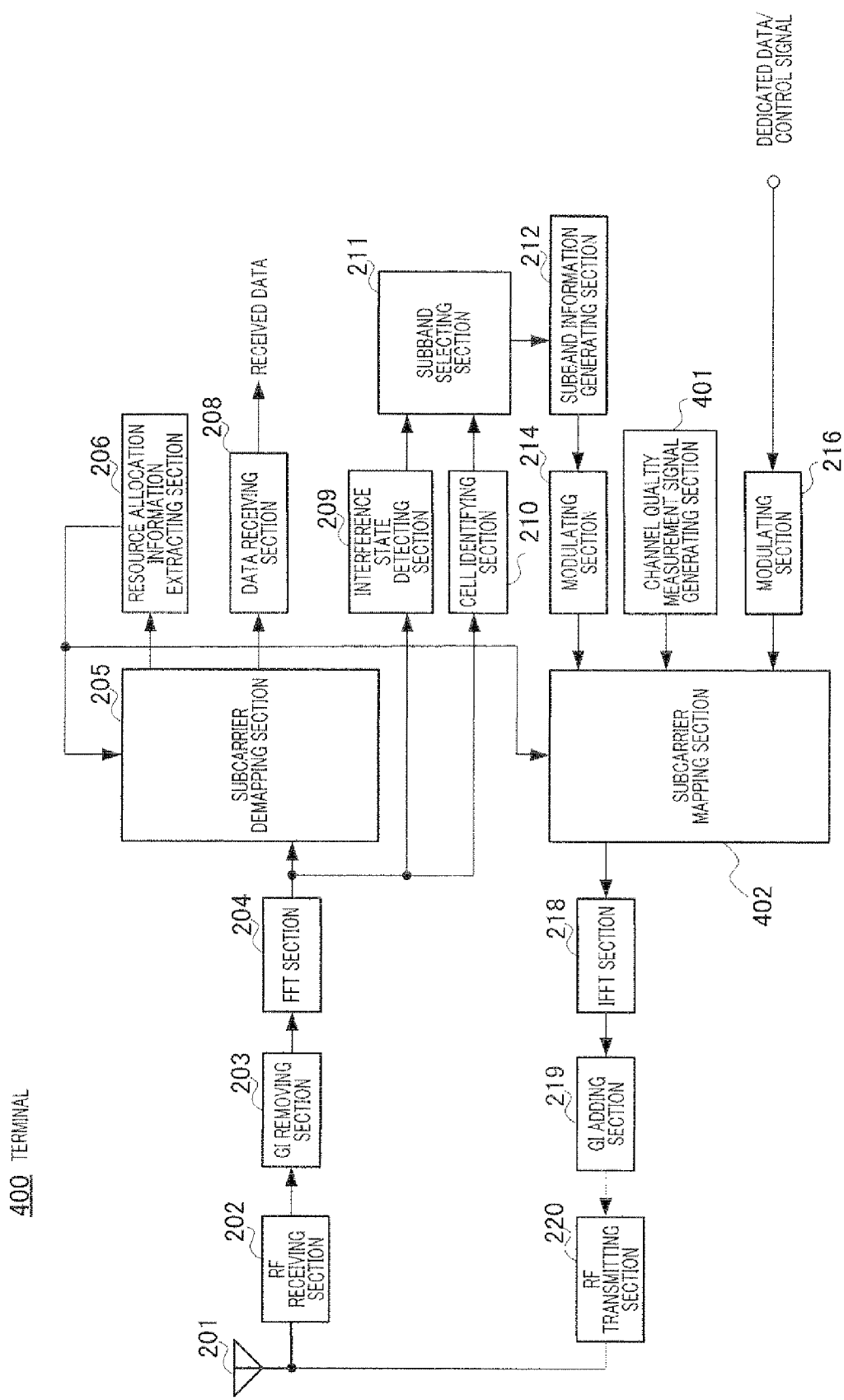
FIG. 23 is a block diagram showing the configuration of a terminal apparatus according to Embodiment 5.

FIG. 23 in which the same components as in FIG. 3 are assigned the same reference numerals shows the configuration of the terminal that implements the above steps according to the present embodiment. Compared to terminal 200 in FIG. 3, terminal 400 in FIG. 23 has the same configuration as terminal 200 in FIG. 3 except for that channel quality measurement signal generating section 401 is provided instead of CQI generating section 213 and modulating section 215, channel quality measuring section 207 is removed and the output of resource allocation information extracting section 206 is also inputted to subcarrier mapping section 402. Further, subcarrier mapping section 402 maps the signal generated in channel quality measurement signal generating section 401, on a subcarrier (i.e. subband) matching resource allocation information.

Embodiment 6

The present embodiment presents an apparatus and method for effectively reducing inter-cell/sector interference by setting the time fields (hereinafter, AFFR (Adaptive Fractional Frequency Reuse) transmission field)) synchronized between a plurality of base stations to perform resource allocation for performing FFR using subband requests from terminals as explained in Embodiment 1.

Here, the "AFFR transmission field" means a time field for performing resource allocation according to autonomous subband requests from terminals as explained in Embodiment 1. To be more specific, the "AFFR transmission field" refers to a time field for performing resource allocation corresponding to subband index ("SBI")≠0.

Figure 24:
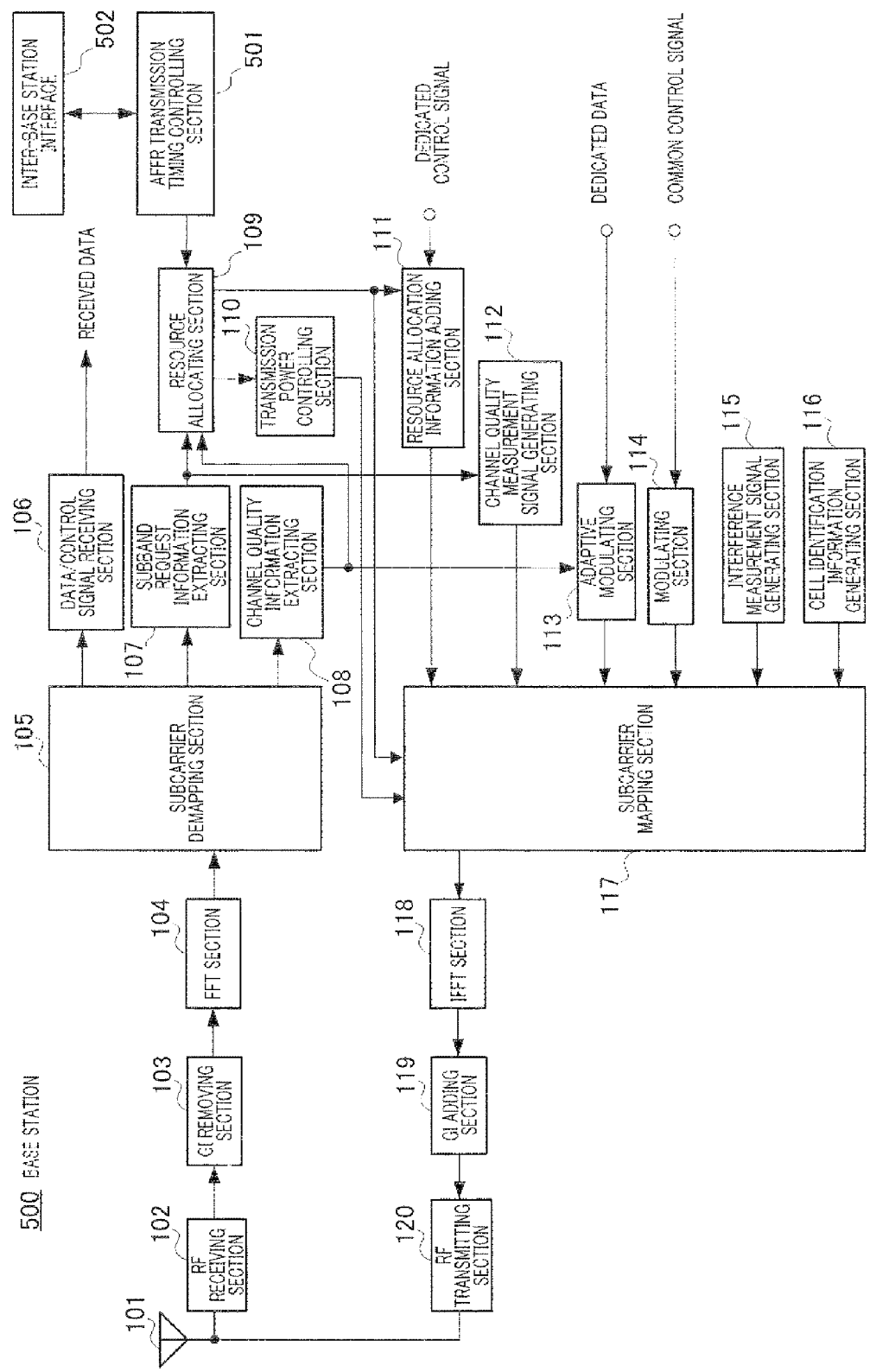
FIG. 24 is a block diagram showing the configuration of a base station apparatus according to Embodiment 6.

FIG. 24 in which the same components as in FIG. 2 are assigned the same reference numerals shows the configuration of the base station according to the present embodiment. Base station 500 additionally has AFFR transmission timing controlling section 501 in the configuration of base station 100 (FIG. 2) of Embodiment 1. AFFR transmission timing controlling section 501 controls a time field (i.e. AFFR transmission field) for performing adaptive FFR transmission. Further, the configuration of the terminal is the same as the configuration in Embodiment 1.

The operation different from the operation in Embodiment 1 will be mainly explained below. Note that the present embodiment assumes that time synchronization is established at predetermined accuracy between base stations of different cells. Further, communication is possible between base stations using inter-base-station communication interface 502.

Figure 25:
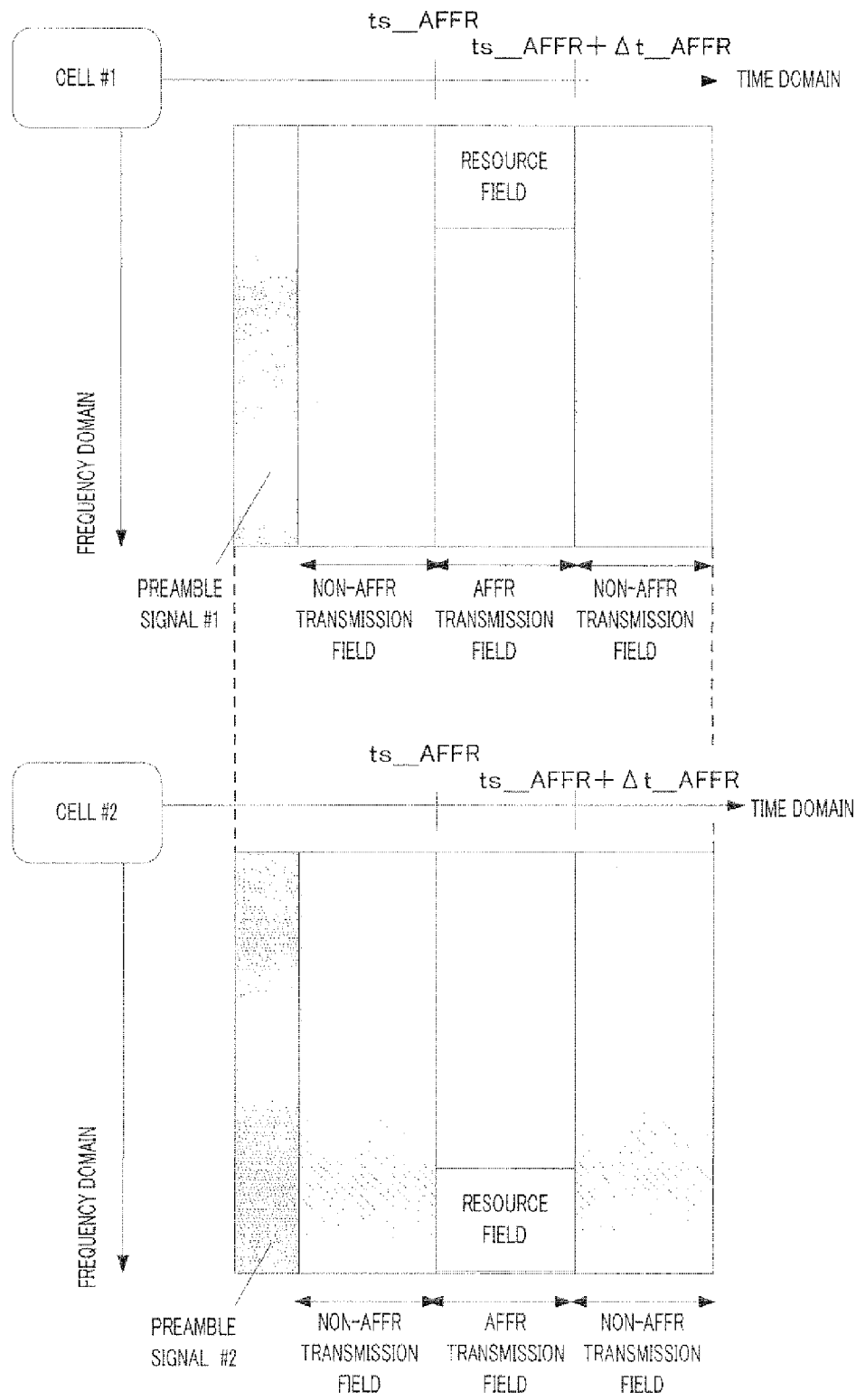
FIG. 25 shows a configuration example of a transmission frame (i.e. an example of resource allocation) in the base station.

As shown in FIG. 25, AFFR transmission timing controlling section 501 controls the timings for AFFR transmission fields in which adaptive FFR is performed and the timings for non-AFFR transmission fields in which adaptive FFR is not performed, at specific timings in a frame to be transmitted from base station 500. This will be explained in detail. AFFR transmission timing controlling section 501 mitigates parameters between base stations by mediating between a plurality of base stations the start timings (ts_AFFR) and time lengths ($\Delta$t_AFFR) in a transmission frame of an AFFR transmission field using inter-base-station communication interface 502, such that a plurality of base stations coordinates timings for AFFR transmission fields within predetermined accuracy (that is, within a guard interval length). Further, the time length (Δt_AFFR) of an AFFR transmission field can be determined based on, for example, the OFDM symbol length.

Resource allocating section 109 allocates resources to terminals based on the output of AFFR transmission timing controlling section 501. That is, in the AFFR transmission field, resources are allocated to a terminal that has transmitted a subband request assuming subband index ("SBI")≠0. By contrast with this, in the non-AFFR transmission field, resources are allocated to a terminal that has transmitted a subband request assuming that subband index ("SBI")=0. Subband index ("SBI")=0 indicates that resources can be allocated to a terminal located around the base station even by using any portion of all subcarriers without any influence of inter-cell interference.

Further, with the present embodiment, it is not necessary to reduce transmission power of a terminal that requests SBI=0 in the non-AFFR transmission field, in order to reduce inter-cell interference. This is because the timings for non-AFFR transmission fields are coordinated between base stations and, consequently, resources are not allocated at the same time to the terminal around the base station that requests SBI=0 and to terminals near the cell edge that request SBI≠0.

Here, apart from the present embodiment, in case where the timings to allocate resources to the combination of terminal apparatuses near the cell edge that have selected and requested subbands ("SBs") for avoiding dominant interference from each other are not coordinated between base stations (for example, a case where resources are allocated to terminals around the base station that have requested SBI=0 and terminals near the cell edge that have requested SBI≠0, at the same time between neighboring cells or sectors), there is a possibility that the advantage of reducing interference is not acquired. Although it is possible to reduce inter-cell interference by limiting subbands which are used to allocate resources per cell, in a fixed manner (static FFR approach) according to subband requests, by contrast, there is a problem that frequency use efficiency decreases.

Therefore, with the present embodiment, time fields (i.e. AFFR transmission fields) for performing resource allocation using subband indices ("SBIs") selected by terminals as explained in Embodiment 1 are provided in synchronization between a plurality of base stations. By this means, AFFR transmission fields match in the time domain, so that it is possible to prevent resources from being allocated to subbands that interfere with each other and further effectively reduce inter-cell/sector interference to terminals near the cell edge. Further, in non-AFFR transmission fields, resources are allocated to terminals around the base station using the frequency reuse factor 1 without interference from other cells, so that it is possible to improve frequency use efficiency.

Further, although a case has been explained with the present embodiment where resource allocating section 109 allocates resources to a terminal that has transmitted subband index ("SBI")≠0, in the AFFR transmission field, there is another method that involves transmission power control as follows. That is, resource allocating section 109 allocates resources to terminals by performing processing of (2) in addition to processing of (1).

(1) The resources are allocated to terminals that have transmitted subband index ("SBI")≠0.

(2) In case where resources are allocated to the terminal that has transmitted SBI=0, interference to other cells or other sectors is reduced by reducing transmission power. This is realized by outputting a signal for controlling transmission power per subband from resource allocating section 109 to transmission power controlling section 110.

Figure 26:
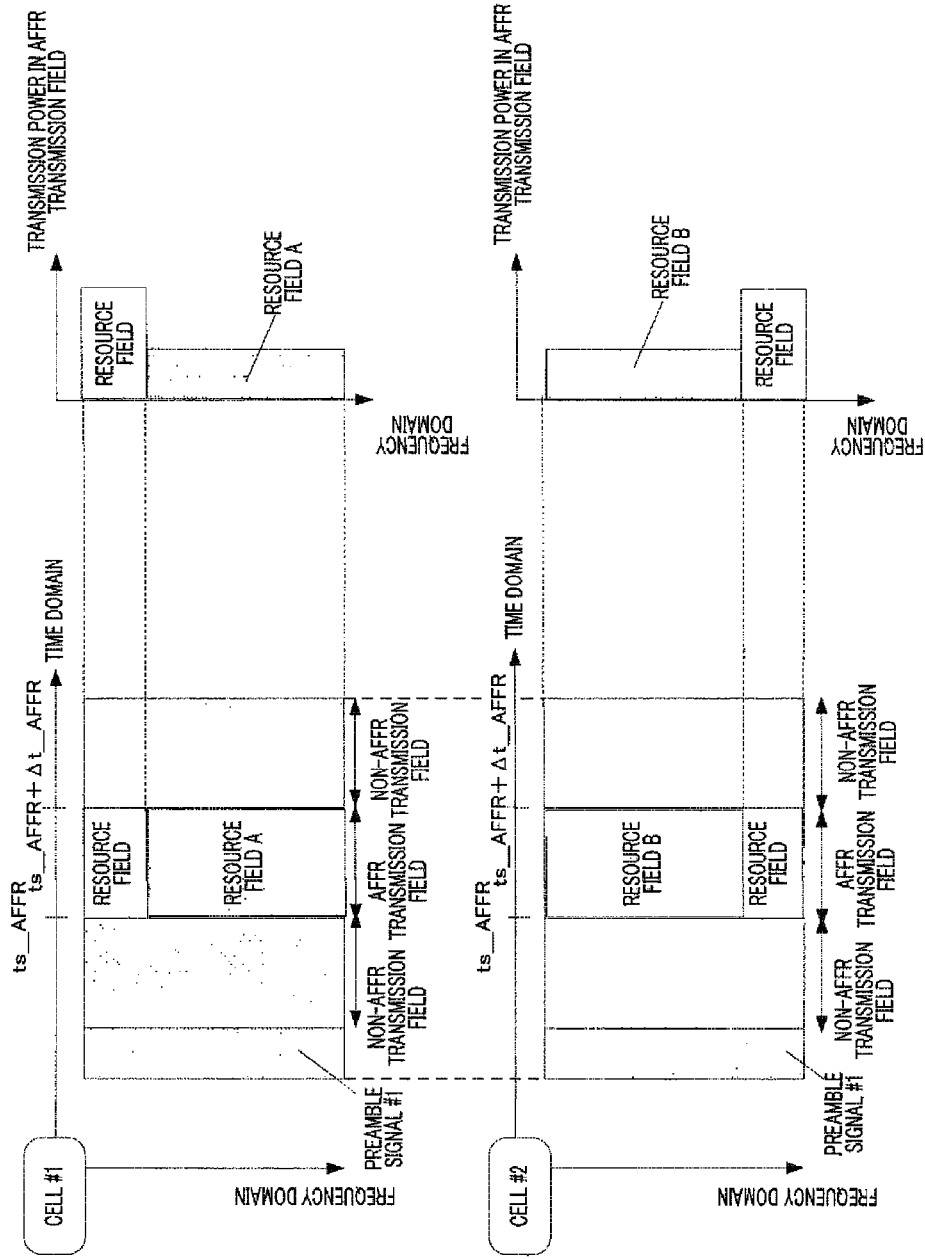
FIG. 26A shows a configuration example of a transmission frame (i.e. an example of resource allocation) in the base station.
FIG. 26B shows an example of transmission power control in an AFFR transmission field.

FIG. 26A shows an example of resource allocation in cell #1 and cell #2, and FIG. 26B shows an example of transmission power control in the AFFR transmission field. In FIG. 26, the AFFR transmission field is divided into the resource field (the resource field shown by blank space in FIG. 26) based on (1) and the resource field based on (2). The resource field based on (2) is resource field A in cell #1 and resource field B in cell #2. Then, as shown in FIG. 26B, transmission power is reduced in resource field A and resource field B in the AFFR transmission field.

As described above, it is possible to further improve frequency use efficiency by dividing the AFFR transmission field into the resource fields (resource fields shown by blank space in FIG. 26) for terminals that have transmitted SBI≠0 and resource fields A and B for the terminal that has transmitted SBI=0 and by reducing transmission power in the resource fields A and B for the terminal that has transmitted SBI=0. This is because the terminal that has transmitted SBI=0 is near the base station, and therefore can secure a constant transmission rate even if transmission power is reduced and reduce interference to other cells by reducing transmission power.

Further, by using directivity transmission (of a closed/open method) in combination in the AFFR transmission field, the base station can further reduce inter-cell or inter-sector interference. The open loop method or closed loop method may be applied as directivity transmission. These methods will be explained briefly.

The open loop method: the base station detects cell identification information near the base station and establishes a linkage between subband requests and transmission weight vectors (or precoding vectors) used in transmission. By this means, information about transmission weight vectors is not required from terminals, so that it is possible to realize directivity transmission while suppressing the increase in the overhead in the system.

The closed loop method: a terminal feeds back desired transmission weight vector information (that is, precoding vector index), to the base station based on a plurality of items of known transmission weight vector information. By this means, transmission weight vector information needs to be fed back, so that, even though the overhead in the system slightly increases, it is possible to enhance the advantage of reducing inter-cell interference by directivity transmission.

Embodiment 7

The present embodiment presents an apparatus and method for effectively reducing inter-cell/sector interference by setting AFFR transmission fields synchronized between a plurality of base stations as explained in Embodiment 1 and by adaptively varying the time field lengths of AFFR transmission fields.

Figure 27:
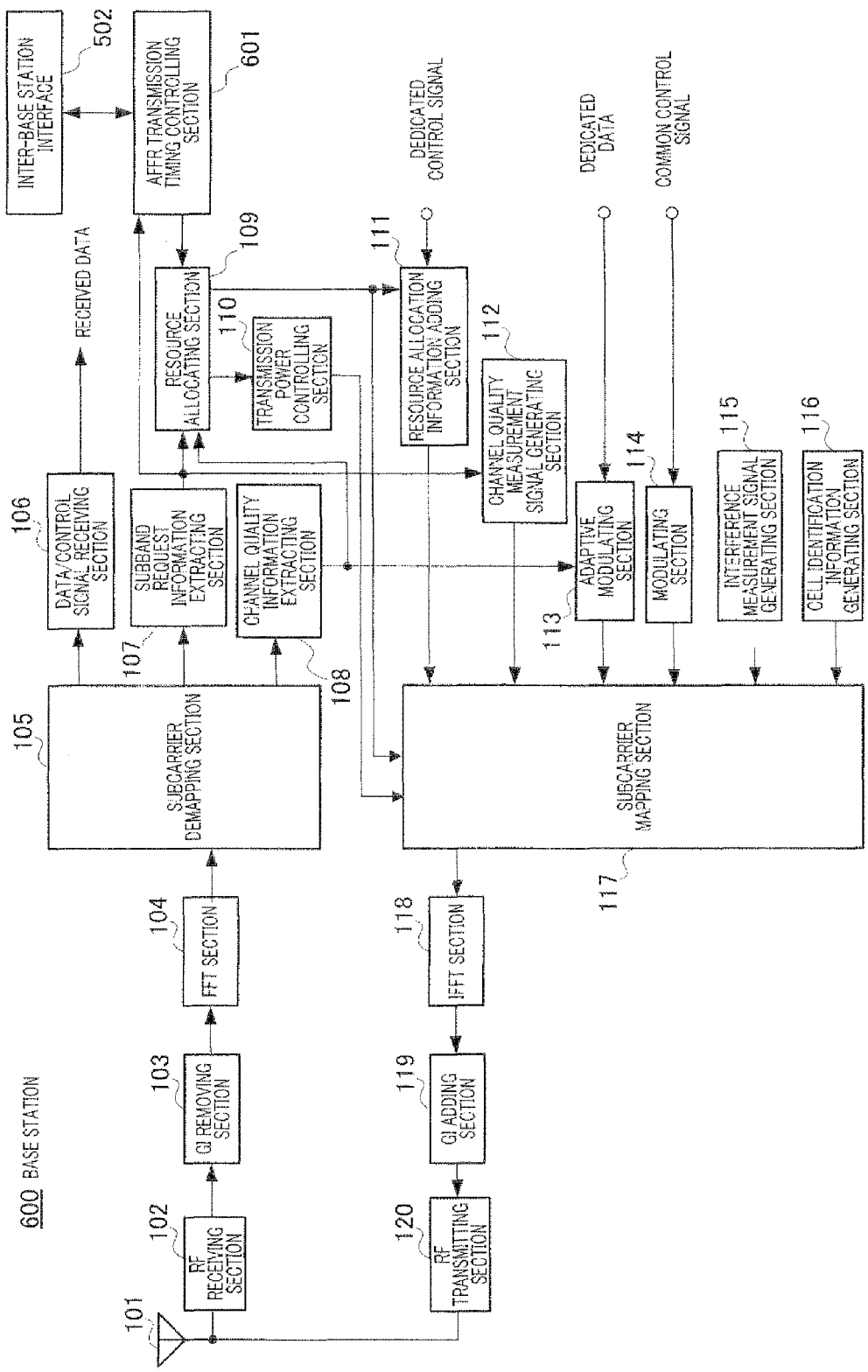
FIG. 27 is a block diagram showing the configuration of a base station apparatus according to Embodiment 7.

FIG. 27 in which the same components as in FIG. 2 are assigned the same reference numerals shows the configuration of the base station according to the present embodiment. Base station 600 additionally has AFFR transmission timing controlling section 601 in the configuration of base station 100 (FIG. 2) of Embodiment 1. AFFR transmission timing controlling section 601 controls a time field (AFFR transmission field) for performing adaptive FFR transmission. Note that how AFFR transmission fields and non-AFFR transmission fields are controlled by AFFR transmission timing controlling section 601 is basically the same as explained in Embodiment 6 using FIG. 25. Further, the configuration of a terminal is the same as the configuration in Embodiment 1.

The operation different from the operation in Embodiment will be mainly explained. Note that the present embodiment assumes that time synchronization is established at predetermined accuracy between base stations of different cells. Further, communication is possible between base stations using inter-base-station communication interface 502.

AFFR transmission timing controlling section 601 adaptively controls the timings for AFFR transmission fields in which adaptive FFR is performed and the timings for non-AFFR transmission fields in which adaptive FFR is not performed, at specific timings in a frame to be transmitted from base station 600 based on the output from subband request information extracting section 107.

Figure 28:
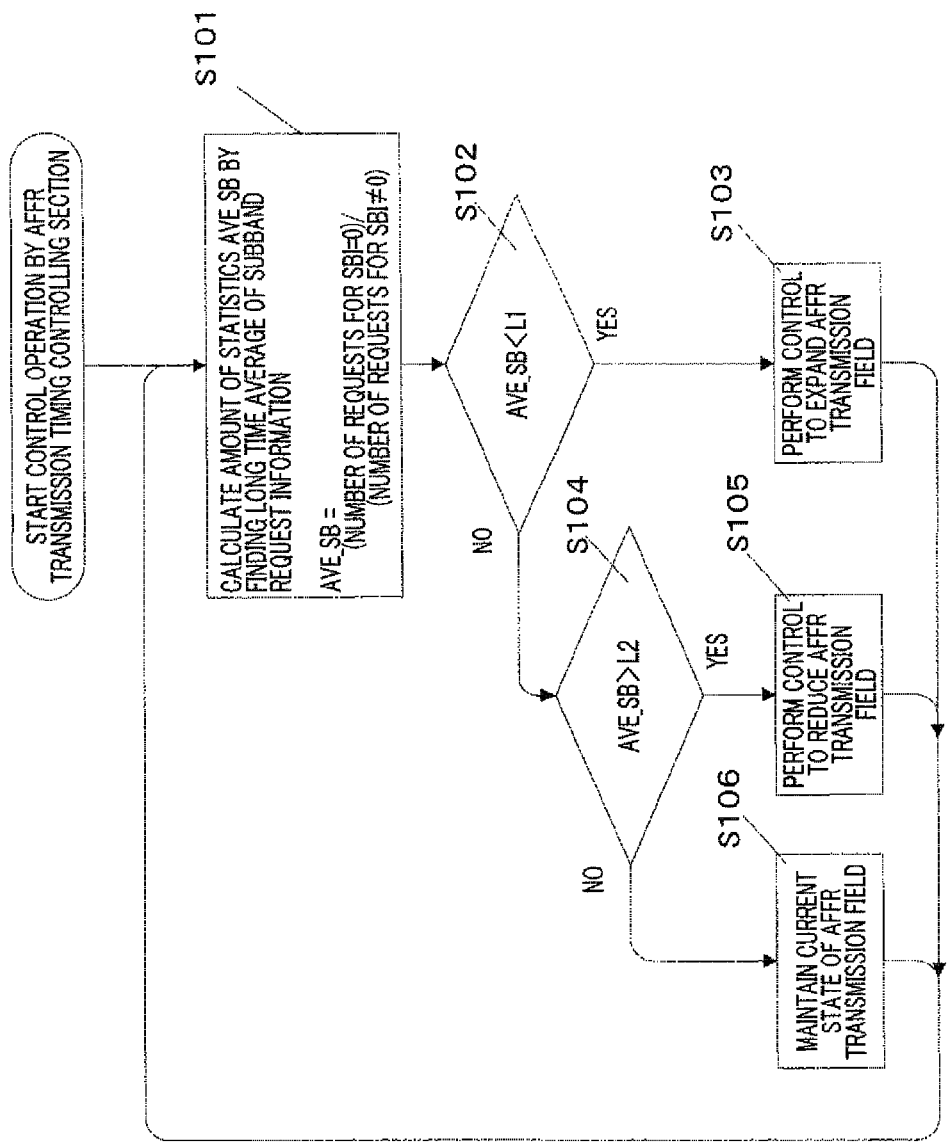
FIG. 28 is a flowchart showing a control operation in an AFFR transmission timing controlling section.

FIG. 28 is a flowchart showing the control operation by AFFR transmission timing controlling section 601. This control operation will be explained below using FIG. 28.

AFFR transmission timing controlling section 601 calculates the amount of statistics AVE_SB represented by following equation 5, by averaging subband request information from terminals over a predetermined time (i.e. finding a long time average), based on the output from subband request information extracting section 107 (step S101).

$$AVE\_SB = (\text{number of requests for SBI=0})/(\text{number of requests for SBI} \neq 0) \quad \text{(Equation 5)}$$

After a predetermined time passes, AFFR transmission timing controlling section 601 compares the calculated amount of statistics AVE_SB and predetermined values L1 and L2 (step S102 and S104). Here, L1<L2 holds.

(1) If AVE_SB<L1 is satisfied, AFFR transmission timing controlling section 601 performs control to expand an AFFR transmission field assuming that the number of requests for SBI=0 is sufficiently small compared to the number of requests for SBI$\neq$0 (step S103). This is the situation where the cell of base station 600 is entirely exposed to interference from other surrounding cells, and therefore AFFR transmission timing controlling section 601 can reduce interference from other cells by expanding AFFR transmission fields.

(2) If AVE_SB>L2 is satisfied, AFFR transmission timing controlling section 601 performs control to reduce AFFR transmission fields assuming that the number of requests for SBI=0 is sufficiently great compared to the number of requests for SBI$\neq$0 (step S105). This is the situation where the cell of base station 600 is not entirely interfered significantly by other surrounding cells, and AFFR transmission timing controlling section 601 improves frequency use efficiency by reducing AFFR transmission fields.

(3) If L1$\leq$AVE_SB$\leq$L2 holds, AFFR transmission timing controlling section 601 performs control to maintain the current state of AFFR transmission fields assuming that the number of domains for SBI=0 is in the adequate range compared to the number of requests for SBI$\neq$0 (step S106).

Here, control to vary AFFR transmission fields is performed by mediating the AFFR transmission fields between base stations using inter-base-station interface 502. By prioritizing the request for expanding AFFR transmission fields upon mediation of the AFFR transmission fields between base stations, it is possible to enhance the advantage of reducing inter-cell interference. Further, control to vary AFFR transmission fields is performed based on the long time average, so that control delay caused by using inter-base-station interface 502 is allowed.

Further, the control to vary AFFR transmission fields is realized by sharing start timings for AFFR transmission fields and by reporting the time lengths of AFFR transmission fields using offset values. By this means, it is possible to reduce the overhead of signaling in inter-base-station interface 502.

Further, if the rate of terminals that have transmitted SBI$\neq$0 is significantly high, AFFR transmission timing controlling section 601 may additionally perform another control to make the operating carrier frequencies of the base station transition to other carrier frequency channels. By this means, the operating carriers transition to other carrier frequency channels in a situation where the cell of base station 600 is almost entirely exposed to interference from other surrounding cells, it is possible to reduce interference from other cells significantly.

Figure 29:
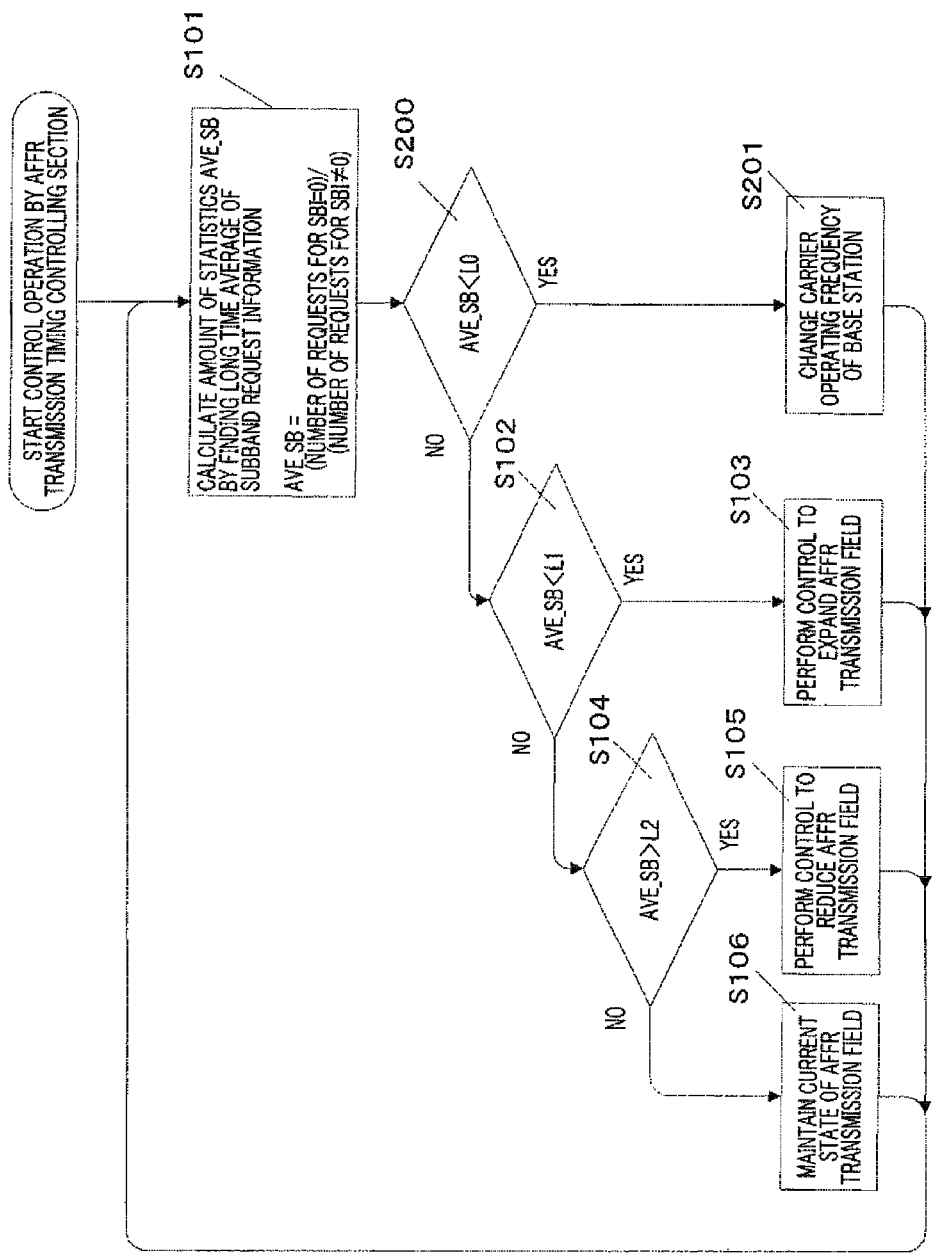
FIG. 29 is a flowchart showing a control operation in an AFFR transmission timing controlling section.

FIG. 29 shows control steps in AFFR transmission timing controlling section 601 in case where the above-described control is performed. FIG. 29 is a flowchart adding steps S200 and S201 in FIG. 28.

After a predetermined time passes, AFFR transmission timing controlling section 601 compares the calculated amount of statistics AVE_SB and predetermined value L0 (step S200). Here, L0<L1 holds.

(4) If AVE_SB<L0 is satisfied, AFFR transmission timing controlling section 601 performs control to change the operating carrier frequency of the base station assuming that the number of requests for SBI=0 is very small compared to the number of requests for SBI$\neq$0 (step S201).

(5) If L0$\leq$AVE_SB is satisfied, AFFR transmission timing controlling section 601 performs control subsequent to step S102 in the same way as the operation explained in FIG. 28.

As described above, according to the present embodiment, by setting AFFR transmission fields synchronized between a plurality of base stations and adaptively varying the time field lengths of AFFR transmission fields, it is possible to further effectively reduce inter-cell/sector interference. For example, with the state of a cell configuration having an overlaying configuration where a smaller area of a base station is superimposed upon the area of a given base station, cases might occur where the rate of terminal apparatuses that belong to a base station of a smaller area and that transmit subband requests (SBI$\neq$0) increases and fixed AFFR transmission fields cannot cover terminal apparatuses. In this case, unbalance occurs between terminals that are assigned to AFFR transmission fields and terminals that are assigned to non-AFFR fields, which deteriorates frequency use efficiency. In such a situation, it is possible to improve frequency use efficiency significantly by applying the present embodiment, which is very effective.

Embodiment 8

The present embodiment presents a configuration of explicitly reporting (signaling) a timing to detect interference states between other cells, from the base station to terminals in a system where the terminals transmit subband requests explained in Embodiment 1.

Figure 30:
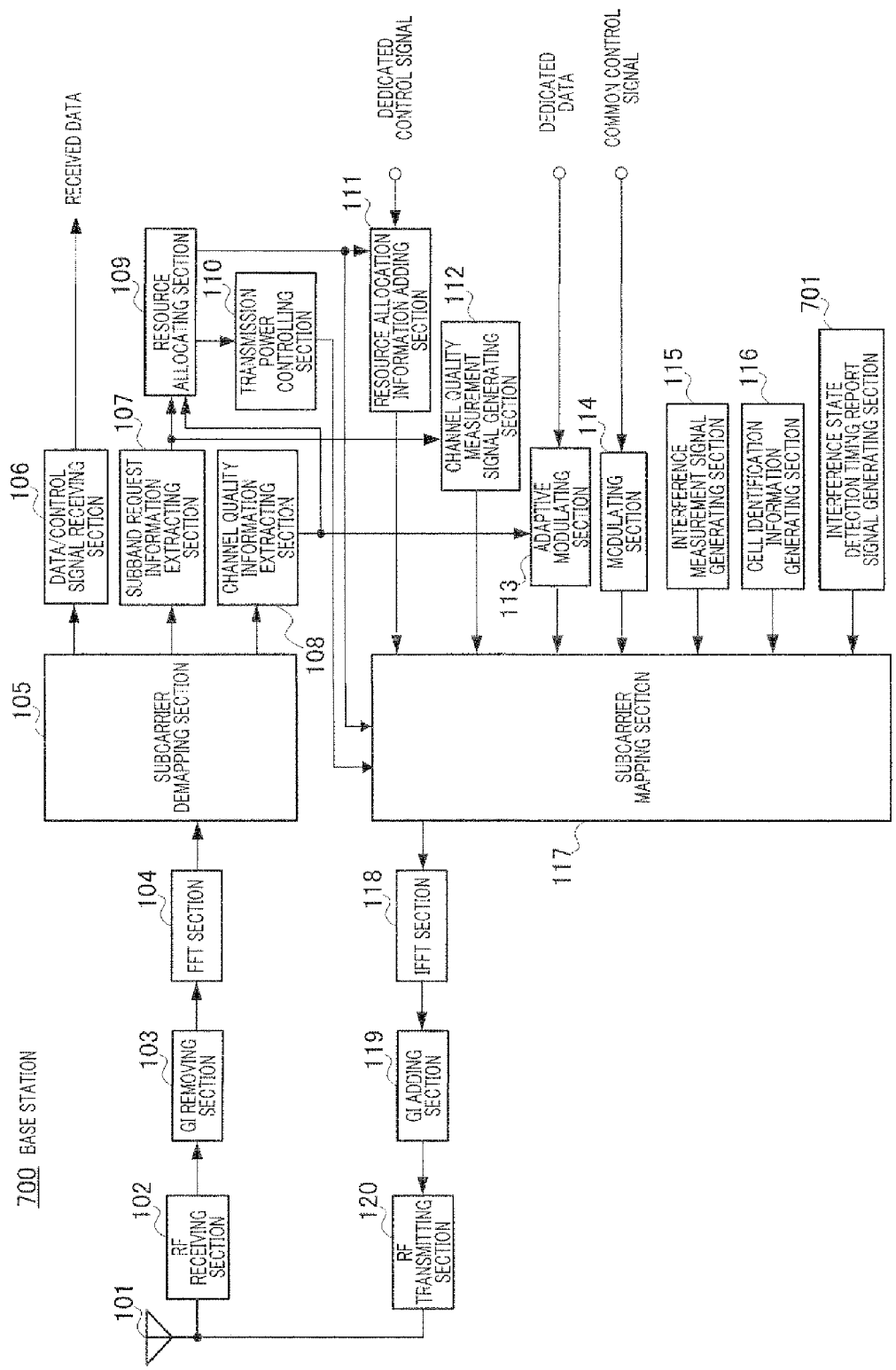
FIG. 30 is a block diagram showing the configuration of a base station apparatus according to Embodiment 8.
Figure 31:
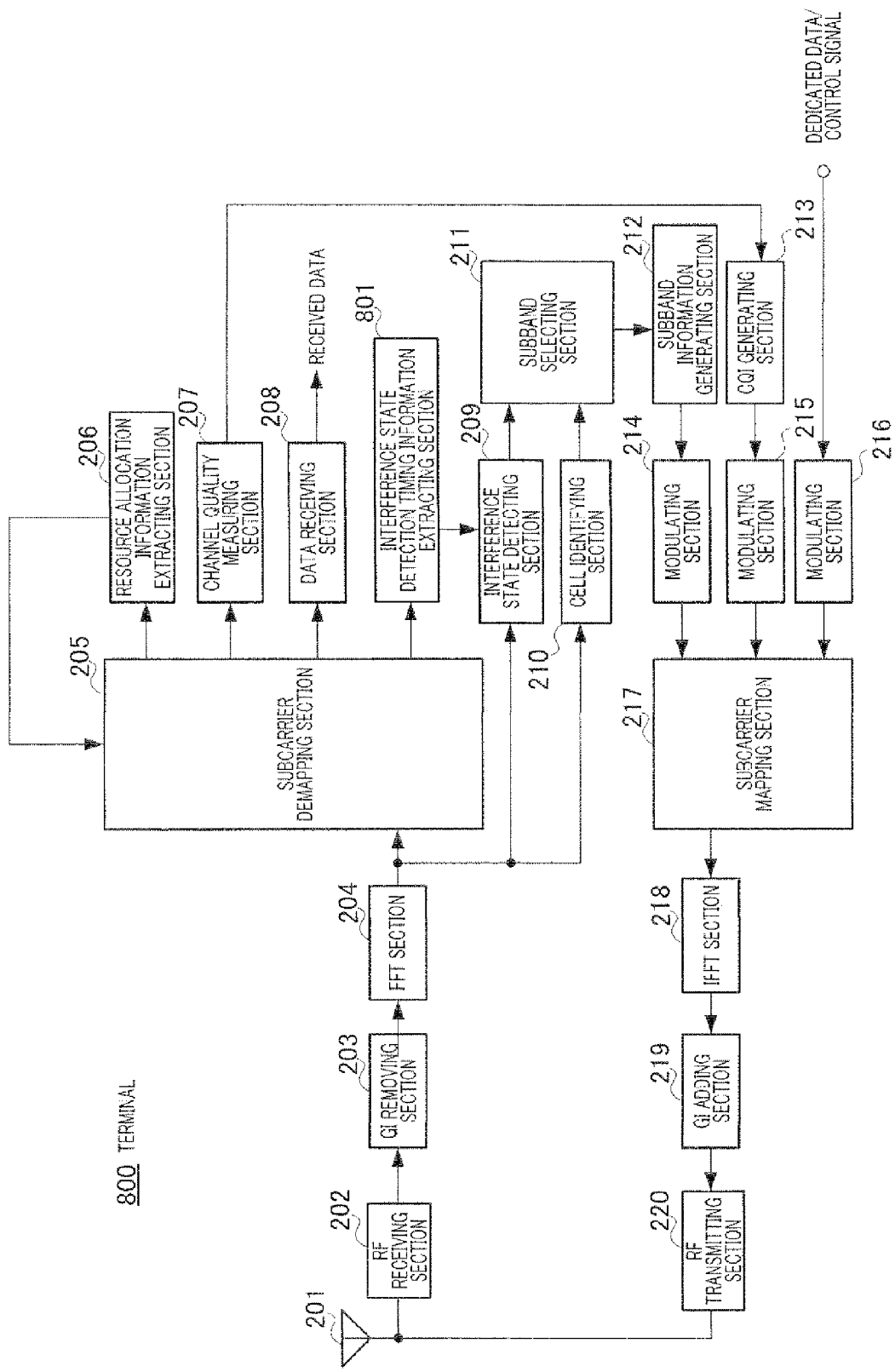
FIG. 31 is a block diagram showing the configuration of a terminal apparatus according to Embodiment 8.
Figure 32:
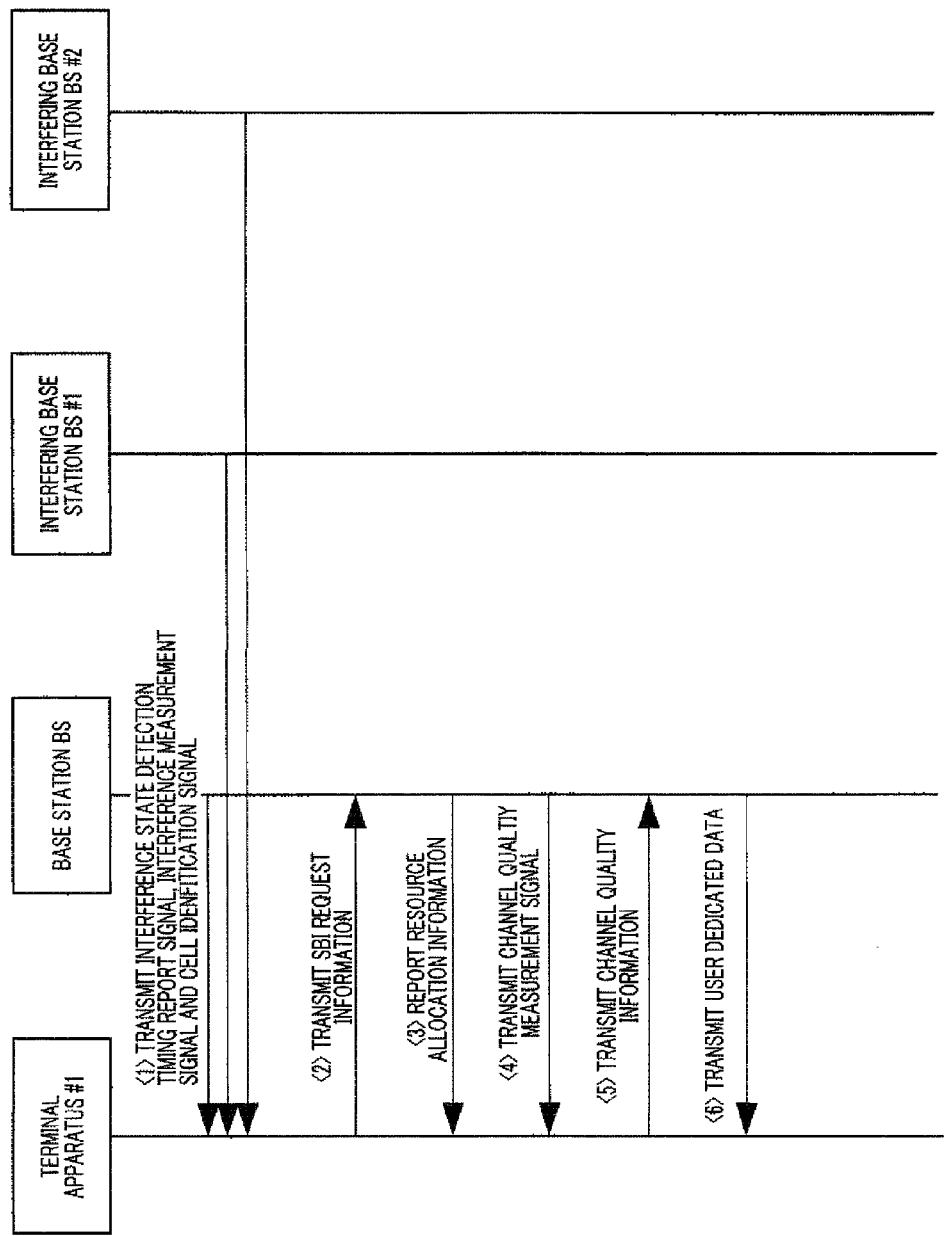
FIG. 32 shows the flow in which a base station transmits dedicated data to a terminal in downlink.

FIG. 30 shows the configuration of the base station according to the present embodiment, and FIG. 31 shows the configuration of the terminal according to the present embodiment. Further, FIG. 32 shows the flow in which the base station according to the present embodiment transmits dedicated data in downlink to a terminal.

Base station 700 in FIG. 30 additionally has interference state detection timing report signal generating section 701 that reports interference state detection timings, in the configuration of base station 100 in FIG. 2 explained in Embodiment 1. Further, mobile 800 in FIG. 31 additionally has interference state detection timing information extracting section 801, in the configuration of terminal 200 shown in FIG. 3 explained in Embodiment 1. Furthermore, in the sequence diagram of FIG. 32, the base station additionally transmits an interference state detection timing report signal to a terminal in step <1> compared to the sequence diagram in FIG. 7 explained in Embodiment 1.

The operation of the present embodiment different from the operation of Embodiment 1 will be mainly explained below.

Interference state detection timing report signal generating section 701 of base station 700 generates a report signal for reporting the timing at which terminal 800 detects interference states between other cells and outputs this report signal to subcarrier mapping section 117. In case where AFFR transmission fields and non-AFFR fields are provided as described in Embodiment 6 and Embodiment 7, preferably, it is desirable to coordinate the timing to detect interference states and the timings for a pilot signal (also referred to as "reference signal"), a synchronization channel ("SCH") signal for establishing synchronization and a broadcast channel ("BCH") signal included in non-AFFR transmission fields. Further, there are the following two methods as the method of reporting the timing in this case.

The method (1) is directed to reporting the reception state detection timing of the cell of base station 700 (D) and the reception state detection timings of cells (U) other than the cell of base station 700 assuming that they are common.

The method (2) is directed to individually reporting the reception state detection timing of the cell of base station 700 (D) and reception state detection timings of cells (U) other than the cell of base station 700.

Subcarrier mapping section 117 maps an output signal from interference state detection timing report signal generating section 701 and a signal addressed to each terminal, on a subcarrier associated with a subband matching the resource allocation information from resource allocating section 109.

Interference state detection timing information extracting section 801 of terminal 800 extracts an interference state detection timing and outputs this signal to interference state detecting section 209. Interference state detecting section 209 measures the state of an inter-cell interference (D/U) from a cell (U) other than the cell to which terminal 800 belongs to the cell (D) to which terminal 800 belongs, from the interference measurement signal S(k) transmitted from each base station based on detection timing information included in the interference state detection timing report signal.

Next, the operation of transmitting dedicated data from base station 700 to terminal 800 in downlink will be explained using FIG. 32. Terminal apparatus #1 in FIG. 32 has the same configuration as in terminal 800 in FIG. 31, and base station BS, interfering base station BS #1 and interfering base station BS #2 in FIG. 32 have the same configuration as in base station 700 in FIG. 30.

First, in step <1>, base station BS (that is, a base station to which terminal apparatus #1 belongs), interfering base station BS #1 (that is, a base station to which terminal apparatus #1 does not belong) and interfering base station BS #2 (that is, a base station to which terminal apparatus #1 does not belong) transmit interference state detection timing report signals, interference measurement signals and cell identification signals.

Next, in step <2>, terminal apparatus #1 selects a subband to which dedicated data addressed to terminal apparatus #1 needs to be assigned, based on the interference state detection timing report signal, interference measurement signal and cell identification signal from each base station, and transmits subband index ("SBI") information indicating the selected subband, to base station BS.

The subsequent operation is the same as in FIG. 7 explained in Embodiment 1.

As described above, according to the present embodiment, in a system in which terminals transmit subband requests, the timing to detect interference states between other cells is reported explicitly from the base station to the terminals, so that it is possible to more accurately detect interference states even in case where the interference state varies depending on the timing of a transmission frame because AFFR transmission fields and non-AFFR transmission fields are provided as in Embodiment 6 and Embodiment 7. As a result, terminals can transmit more accurate subband requests, so that it is possible to improve system throughput.

The disclosure of Japanese Patent Application No. 2007-208611, filed on Aug. 9, 2007, including the specification, drawings and abstract, is incorporated herein by reference in its entirety.

INDUSTRIAL APPLICABILITY

The present invention is suitably applied to a terminal apparatus, base station apparatus and frequency resource allocation method for performing adaptive FFR control.

The invention claimed is:

1. A terminal apparatus comprising:
an interference state detecting section configured to detect a state of interference from other cells to a cell to which the terminal apparatus belongs, based on signals transmitted from a plurality of base stations;
a subband selecting section configured to select a subband used in downlink transmission for the terminal apparatus, based on the interference state detected in the interference state detecting section; and
a transmitting section configured to transmit information on the subband selected in the subband selecting section, to a base station of the cell to which the terminal apparatus belongs,
wherein the subband selecting section selects all subbands when interference from other cells to the cell to which the terminal apparatus belongs is equal to or less than a predetermined threshold.

2. A terminal apparatus comprising:
an interference state detecting section configured to detect a state of interference from other cells to a cell to which the terminal apparatus belongs, based on signals transmitted from a plurality of base stations;
a subband selecting section configured to select a subband used in uplink transmission for a base station of a cell to which the terminal apparatus belongs, based on the interference state detected in the interference state detecting section; and
a transmitting section configured to perform uplink transmission using the subband selected in the subband selecting section,
wherein the subband selecting section selects all subbands when interference from other cells to the cell to which the terminal apparatus belongs is equal to or less than a predetermined threshold.

3. The terminal apparatus according to one of claim 1 and claim 2, wherein the subband selecting section selects a subband that is distant apart from a center frequency toward one of a lower frequency side and a higher frequency side when interference from other cells to the cell to which the terminal apparatus belongs is significant.

4. The terminal apparatus according to one of claim 1 and claim 2, wherein the subband selecting section expands subbands to select, toward both sides of a center frequency when interference from other cells to the cell to which the terminal apparatus belongs becomes more significant.

5. The terminal apparatus according to one of claim 1 and claim 2, wherein the interference state detecting section detects the interference state based on a signal for synchronization used in an initial cell search.

6. The terminal apparatus according to one of claim 1 and claim 2, wherein:
the subband selected in the subband selecting section is determined by a subband index; and
the transmitting section transmits a subband index matching the subband selected in the subband selecting section.

7. The terminal apparatus according to claim 6, wherein subbands determined by subband indices partially overlap between subband indices.

8. The terminal apparatus according to one of claim 1 and claim 2, further comprising a cell identifying section configured to acquire signals for cell identification of the plurality of base stations,
wherein the subband selecting section selects the subband based on the interference state detected in the interference state detecting section and the signals for cell identification of the base stations acquired in the cell identifying section.

9. The terminal apparatus according to claim 8, wherein the subband selecting section selects a subband that is distant apart from a center frequency toward one of a lower frequency side and a higher frequency side when interference from other cells to the cell to which the terminal apparatus belongs is significant, and decides whether to select one of a subband of the lower frequency side and a subband of the higher frequency side of the center frequency, based on an identification signal of the cell to which the terminal apparatus belongs and identification signals of the other cells.

10. The terminal apparatus according to claim 8, wherein:
the signals for cell identification of each base station is a cell identification; and
the subband selecting section decides whether to select one of a subband of a lower frequency side and a subband of a higher frequency side of the center frequency, based on whether a cell identification of the cell to which the terminal apparatus belongs is greater than cell identifications of the other cells.

11. The terminal apparatus according to claim 8, wherein:
the subband selected in the subband selecting section is determined by a subband index; and
the transmitting section transmits a subband index matching the subband selected in the subband selecting section.

12. The terminal apparatus according to claim 11, wherein subbands determined by subband indices partially overlap between subband indices.

13. A base station apparatus comprising:
a subband selection information acquiring section that acquires information about a subband selected by a terminal;
a transmitting/receiving section that performs transmission to and reception from the terminal using the subband selected by the terminal; and
a transmission power controlling section that controls transmission power of the transmitting/receiving section, based on the information about the subband selected by the terminal,
wherein a channel quality measurement signal is transmitted in a bandwidth wider than the subband selected by the terminal.

14. The base station apparatus according to claim 13, wherein, when the terminal selects a subband including a center frequency, the transmission power controlling section decreases transmission power for a subband that is more distant apart from the center frequency.

15. The base station apparatus according to claim 13, further comprising an adaptive fractional frequency reuse transmission timing controlling section configured to synchronize, between neighboring base station apparatuses, adaptive fractional frequency reuse transmission fields to which data addressed to the terminal is assigned according to the information about the subband selected by the terminal.

16. The base station apparatus according to claim 15, wherein the adaptive fractional frequency reuse transmission timing controlling section controls a range of the adaptive fractional frequency reuse transmission field, based on the information about the subband selected by the terminal.

17. The base station apparatus according to claim 15, wherein an operating carrier is changed based on the information about the subband selected by the terminal.

18. The base station apparatus according to claim 13, wherein:
the terminal detects a state of interference from other cells to the cell to which the terminal belongs, based on signals transmitted from a plurality of base station apparatuses, and selects a subband based on the detected interference state; and
the base station apparatus further comprises a reporting section configured to report to the terminal a timing to detect the interference state.

19. A frequency resource allocation method performed by a terminal apparatus, comprising:
detecting a state of interference from other cells to a cell to which the terminal apparatus belongs, based on signals transmitted from a plurality of base stations;
selecting a subband based on the detected interference state; and
performing communication using the selected subband,
wherein all subbands are selected when interference from other cells to the cell to which the terminal apparatus belongs is equal to or less than a predetermined threshold.

20. The frequency resource allocation method according to claim 19, further comprising:
acquiring signals for cell identification of the plurality of base stations,
wherein the subband is selected based on the interference state and the signals for cell identification.

21. A frequency resource allocation method performed by a terminal apparatus, comprising:
detecting a state of interference from other cells to a cell to which the terminal apparatus belongs, based on signals transmitted from a plurality of base stations;
selecting a subband based on the detected interference state; and
transmitting information on the selected subband to a base station of the cell which the terminal apparatus belongs,
wherein all subbands are selected when interference from other cells to the cell to which the terminal apparatus belongs is equal to or less than a predetermined threshold.

22. A transmission method performed by a base station apparatus, comprising:

acquiring information about a subband selected by a terminal;

performing transmission to and reception from the terminal using the subband selected by the terminal; and controlling transmission power based on the information about the subband selected by the terminal, wherein a channel quality measurement signal is transmitted in a bandwidth wider than the subband selected by the terminal.

* * * * *